US008819454B2

(12) United States Patent
Koifman et al.

(10) Patent No.: US 8,819,454 B2
(45) Date of Patent: *Aug. 26, 2014

(54) SYSTEMS AND METHODS FOR TRANSFORMATION OF LOGICAL DATA OBJECTS FOR STORAGE

(75) Inventors: Chaim Koifman, Rishon Lezion (IL); Nadav Kedem, Tel Aviv (IL); Avi Zohar, Rosh Haain (IL)

(73) Assignee: International Business Machines Corporation, Armonk, NY (US)

(*) Notice: Subject to any disclaimer, the term of this patent is extended or adjusted under 35 U.S.C. 154(b) by 238 days.

This patent is subject to a terminal disclaimer.

(21) Appl. No.: 13/398,143

(22) Filed: Feb. 16, 2012

(65) Prior Publication Data

US 2012/0144207 A1    Jun. 7, 2012

Related U.S. Application Data

(63) Continuation of application No. 12/302,643, filed as application No. PCT/IL2007/000667 on May 31, 2007.

(60) Provisional application No. 60/809,382, filed on May 31, 2006.

(51) Int. Cl.
    *G06F 12/14*    (2006.01)
(52) U.S. Cl.
    USPC ............. 713/193; 713/181; 710/68; 380/59; 707/999.101
(58) Field of Classification Search
    CPC . G06F 12/1408; G06F 9/461; G06F 11/0766; G06F 11/1402; G06F 21/568; H04L 9/0637; H04L 9/0894; H04L 12/2607; H04L 67/2842
    USPC .................. 713/181, 193; 710/68; 380/59; 707/999.101
    See application file for complete search history.

(56) References Cited

U.S. PATENT DOCUMENTS

| 5,142,282 A | 8/1992 | Tobin et al. |
| 5,235,641 A | 8/1993 | Nozawa et al. |

(Continued)

FOREIGN PATENT DOCUMENTS

| EP | 0747806 A2 | 12/1996 |
| EP | 1300843 A2 | 4/2003 |

(Continued)

OTHER PUBLICATIONS

White Paper by EMC, "LEveraging Networked Storage for Your Business," Mar. 2003, 17 pages.

(Continued)

*Primary Examiner* — Thanhnga B Truong
(74) *Attorney, Agent, or Firm* — Griffiths & Seaton PLLC

(57) ABSTRACT

Systems and methods for encrypting a plaintext logical data object for storage in a storage device operable with at least one storage protocol, creating, reading, writing, optimization and restoring thereof. Encrypting the plaintext logical data object comprises creating in the storage device an encrypted logical data object comprising a header and one or more allocated encrypted sections with predefined size; encrypting one or more sequentially obtained chunks of plaintext data corresponding to the plaintext logical data object thus giving rise to the encrypted data chunks; and sequentially accommodating the processed data chunks into said encrypted sections in accordance with an order said chunks received, wherein said encrypted sections serve as atomic elements of encryption/decryption operations during input/output transactions on the logical data object.

21 Claims, 20 Drawing Sheets

(56) References Cited

U.S. PATENT DOCUMENTS

| | | |
|---|---|---|
| 5,285,497 A | 2/1994 | Thatcher, Jr. |
| 5,305,295 A | 4/1994 | Chu |
| 5,623,701 A | 4/1997 | Bakke et al. |
| 5,649,151 A | 7/1997 | Chu et al. |
| 5,802,344 A | 9/1998 | Menon et al. |
| 5,812,817 A | 9/1998 | Hovis et al. |
| 5,813,011 A | 9/1998 | Yoshida et al. |
| 5,813,017 A | 9/1998 | Morris |
| 5,860,103 A | 1/1999 | Franaszek et al. |
| 5,956,504 A | 9/1999 | Jagadish et al. |
| 6,021,198 A | 2/2000 | Anigbogu et al. |
| 6,092,071 A | 7/2000 | Bolan et al. |
| 6,115,787 A | 9/2000 | Obara |
| 6,122,378 A | 9/2000 | Yoshiura et al. |
| 6,148,336 A | 11/2000 | Thomas et al. |
| 6,154,542 A | 11/2000 | Crandall |
| 6,157,720 A | 12/2000 | Yoshiura et al. |
| 6,349,375 B1 | 2/2002 | Faulkner et al. |
| 6,373,803 B2 | 4/2002 | Ando et al. |
| 6,414,610 B1 | 7/2002 | Smith |
| 6,449,689 B1 | 9/2002 | Corcoran et al. |
| 6,532,121 B1 | 3/2003 | Rust et al. |
| 6,728,722 B1 | 4/2004 | Shaylor |
| 6,742,176 B1 | 5/2004 | Million et al. |
| 2001/0014070 A1 | 8/2001 | Ando et al. |
| 2001/0025344 A1 | 9/2001 | Teglia |
| 2002/0078241 A1 | 6/2002 | Vidal et al. |
| 2002/0199121 A1 | 12/2002 | Stanford-Clark |
| 2003/0206635 A1 | 11/2003 | Morley et al. |
| 2004/0015724 A1 | 1/2004 | Pham et al. |
| 2004/0030813 A1 | 2/2004 | Benveniste et al. |
| 2004/0054858 A1 | 3/2004 | Chandrasekaran et al. |
| 2004/0153642 A1 | 8/2004 | Plotkin et al. |
| 2004/0199669 A1 | 10/2004 | Riggs et al. |
| 2004/0218760 A1 | 11/2004 | Chaudhuri |
| 2004/0264698 A1 | 12/2004 | Oda |
| 2005/0021657 A1 | 1/2005 | Negishi et al. |
| 2005/0102561 A1 | 5/2005 | Graham |
| 2005/0204154 A1 | 9/2005 | Osaki |
| 2005/0210422 A1 | 9/2005 | Galatenko et al. |
| 2005/0257062 A1 | 11/2005 | Ignatius et al. |
| 2006/0004808 A1 | 1/2006 | Hsu et al. |
| 2006/0190643 A1 | 8/2006 | Kedem et al. |
| 2006/0230014 A1 | 10/2006 | Kedem et al. |
| 2007/0005627 A1 | 1/2007 | Dodge |
| 2007/0130470 A1* | 6/2007 | Blom et al. .................. 713/181 |
| 2007/0208893 A1* | 9/2007 | Azzarello et al. .............. 710/68 |

FOREIGN PATENT DOCUMENTS

| | | |
|---|---|---|
| GB | 2315575 A | 2/1998 |
| JP | 1131935 A | 5/1989 |
| JP | 05324485 A | 12/1993 |
| JP | 06290087 A | 10/1994 |
| JP | 07261937 A | 10/1995 |
| JP | 8314689 A | 11/1996 |
| JP | 2002196954 A | 7/2002 |
| WO | WO0201271 A1 | 1/2002 |
| WO | 2005010878 A1 | 2/2005 |
| WO | 2005103878 A2 | 11/2005 |

OTHER PUBLICATIONS

Ziv et al., "A Universal Algorithm for Sequential Data Compression," IEEE Transactions on Information Theory, IT-23, pp. 337-343, 1997.

* cited by examiner

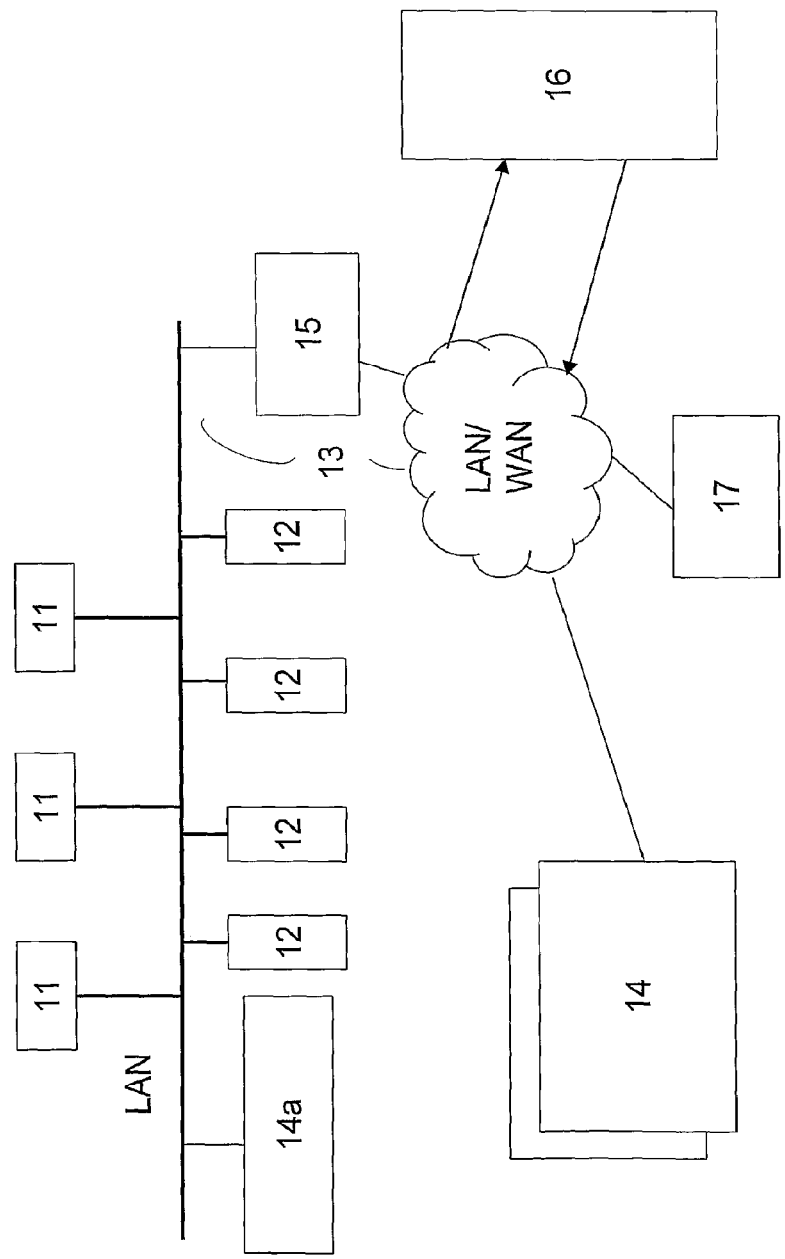

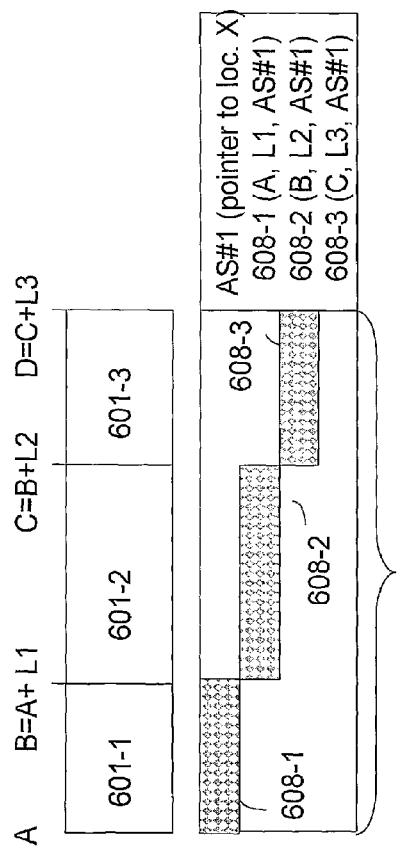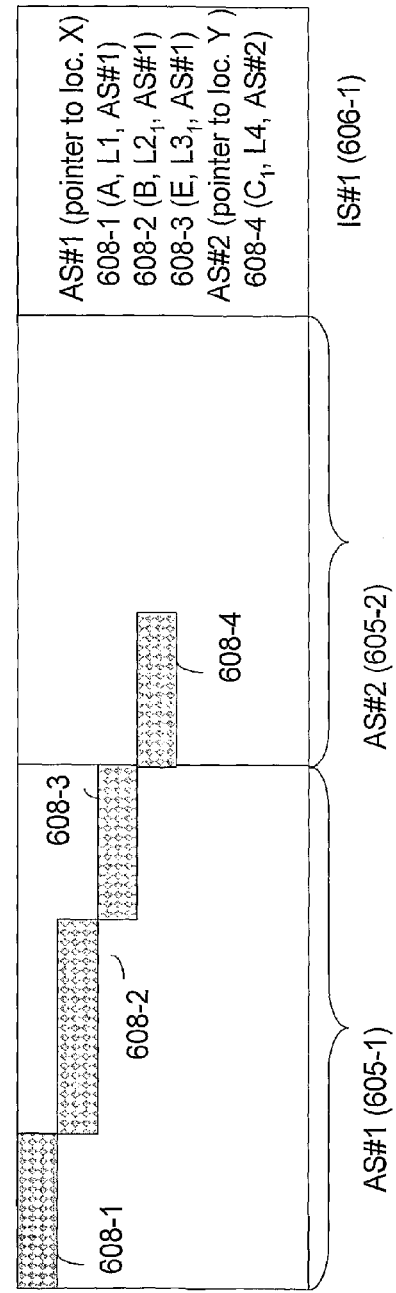
Figure 6a
Figure 6b

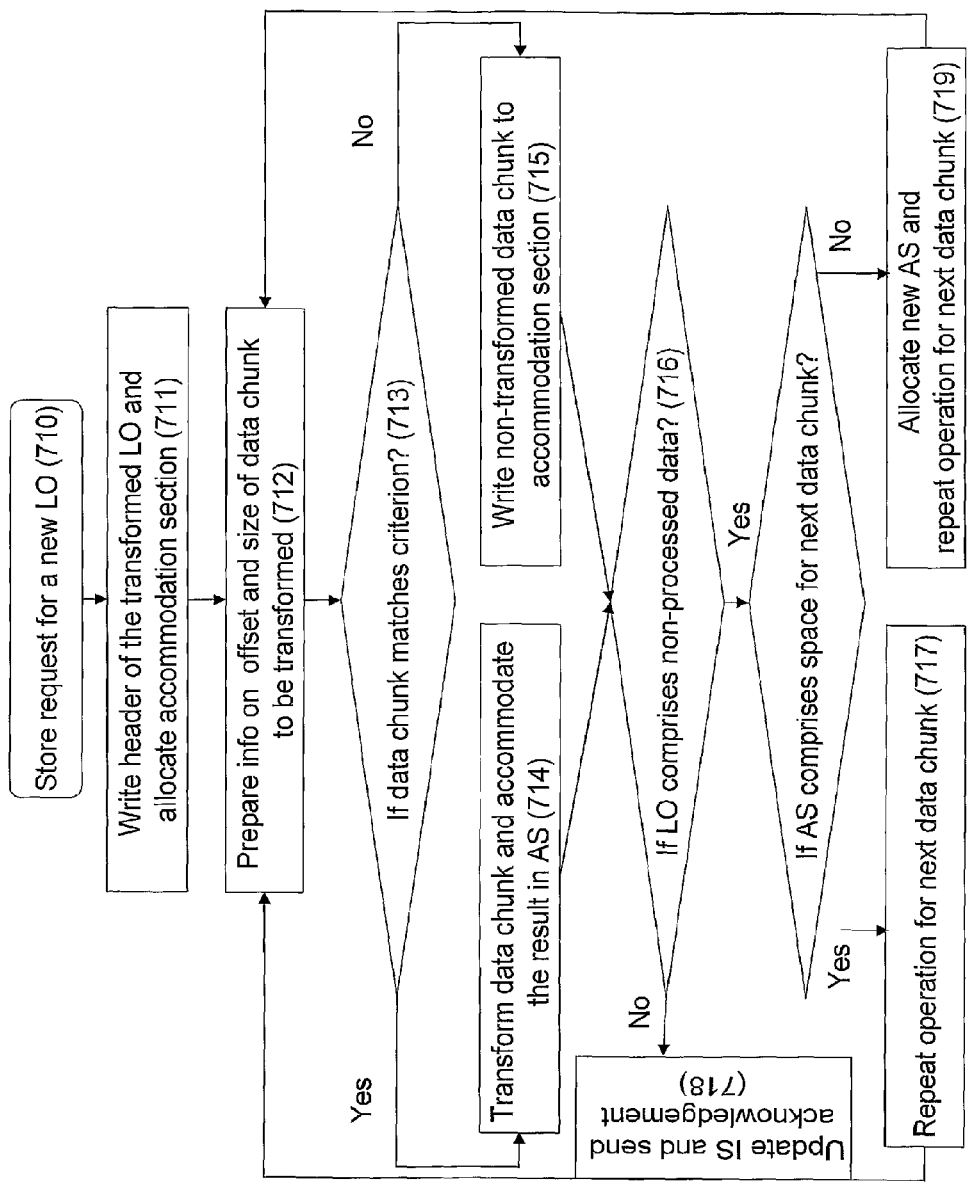

A     B=A+L1     C=B+L2     D=C+L3

| 601-1 | 601-2 | 601-3 |

A     B=A+L1    $C_1$=B+$L2_1$    E=$C_1$+L4    D=E+$L3_1$

| 601-1 | 601-$2_1$ | 601-4 | 601-$3_1$ |

| Log | Log records | Time Stamp | Offset | Length | Accommodation section |
|---|---|---|---|---|---|
| 608-1 | 608-1-1 | 11:00 | A | L1 | AS#1, pos. X |
| 608-2 | 608-2-1 | 11:01 | B | L2 | AS#1, pos. X |
|  | 608-2-2 | 12:03 | B | $L2_1$ |  |
| 608-3 | 608-3-1 | 11:16 | C | L3 | AS#1, pos. X |
|  | 608-3-2 | 12:03 | E | $L3_1$ |  |
| 608-4 | 608-4 | 12:03 | C1 | L4 | AS#2, pos. Y |

SYSTEMS AND METHODS FOR TRANSFORMATION OF LOGICAL DATA OBJECTS FOR STORAGE

CROSS REFERENCE TO RELATED APPLICATIONS

The present application is a Continuation of U.S. patent application Ser. No. 12/302,643, filed on Aug. 4, 2009, which claims priority to PCT Patent Application No. PCT/IL2007/000667, filed on May 31, 2007, which claims priority to U.S. Provisional Patent Application No. 60/809,382, filed on May 31, 2006.

FIELD OF THE INVENTION

This invention relates to computing systems, and, in particular, to methods and systems capable of transforming logical data objects to be stored in computing systems and networks thereof.

BACKGROUND OF THE INVENTION

In current business environment, all types of business data are becoming more and more crucial to business success. The tremendous growth and complexity of business-generated data is driving the demand for information storage, defining the way of sharing, managing and protection of information assets.

Typically, no single technology or architecture is able to address all the needs of any organization. Main storage technologies are described, for example, in the White Paper by EMC, "Leveraging Networked storage for your business," March 2003, USA and basically can be identified by location and connection type (intra-computer storage, direct attached storage (DAS), IP, channel networks, etc.) and by the method that data is accessed. There are three basic types of storage architectures to consider in connection with methods of data access: Block Access, File Access, and Object Access.

In block mode access architecture, the communication between a server/client and a storage medium occurs in terms of blocks; information is pulled block by block directly from the disk. The operation system keeps track of where each piece of information is on the disk, while the storage medium is usually not aware of the file system used to organize the data on the device. When data need to be read or updated, the data are directly accessed from the disk by that processor which knows where each block of data is located on the disk and how to access it. Examples of block mode access storage technologies are DAS (Direct Attached Storage), SAN (Storage Area Network), Block Storage over IP (e.g. FCIP, iFCP, iSCSI, etc.), intra-memory storage, etc.

File access requires the server or client to request a file by name, not by physical location. As a result, a storage medium (external storage device or storage unit within a computer) is usually responsible to map files back to blocks of data for creating, maintaining and updating the file system, while the block access is handled "behind the scenes." Examples of file access storage technologies are NAS (Network Attached Storage with NFS, CIFS, HTTP, etc. protocols), MPFS (Multi-Pass File Serving), intra-computer file storage, etc. The file access storage may be implemented, for example, for general purpose files, web applications, engineering applications (e.g. CAD, CAM, software development, etc.), imaging and 3D data processing, multi-media streaming, etc.

Object access further simplifies data access by hiding all details about block, file and storage topology from the application. The object access occurs over API integrated in content management application. An example of object access storage technology is CAS (Content Addressed Storage).

The logical data objects (data files, image files, data blocks, etc.) may be transformed for transmission and/or storage. The transformation may comprise compression, encryption, encoding, conversion, etc. and/or combinations thereof. For example, data compression techniques are used to reduce the amount of data to be stored or transmitted in order to reduce the storage capacity and transmission time respectively. Compression may be achieved by using different compression algorithms, for instance, a standard compression algorithm, such as that described by J. Ziv and A. Lempel, "A Universal Algorithm For Sequential Data Compression," IEEE Transactions on Information Theory, IT-23, pp. 337-343 (1997).

Various implementations of compressing data for storage and access to the stored data are disclosed, for example, in the following patent publications:

U.S. Pat. No. 5,813,011 (Yoshida et al.) entitled "Storage of a compressed file containing its own compression management table;"

U.S. Pat. No. 5,813,017 (Morris et al.) entitled "System and method for reducing storage requirement in backup subsystems utilizing segmented compression and differencing;"

U.S. Pat. No. 5,956,504 (Jagadish et al.) entitled "Method and system for compressing a data stream in a database log so as to permit recovery of only selected portions of the data stream;"

U.S. Pat. No. 6,092,071 (Bolan et al.) entitled "Dedicated input/output processor method and apparatus for access and storage of compressed data;"

U.S. Pat. No. 6,115,787 (Obara et al.) entitled "Disc storage system having cache memory which stores compressed data;"

U.S. Pat. No. 6,349,375 (Faulkner et al.) entitled "Compression of data in read only storage and embedded systems;"

U.S. Pat. No. 6,449,689 (Corcoran et al.) entitled "System and method for efficiently storing compressed data on a hard disk drive;"

U.S. Pat. No. 6,532,121 (Rust et al) entitled "Compression algorithm with embedded meta-data for partial record operation augmented with expansion joints;"

U.S. Patent Application No. 2002/078241 (Vidal et al.) entitled "Method of accelerating media transfer;"

U.S. Patent Application No. 2004/030,813 (Benveniste et al.) entitled "Method and system for storing memory compressed data onto memory compressed disks;"

U.S. Patent Application No. 2004/054,858 (Sashikanth et al.) entitled "Method and mechanism for on-line data compression and in-place updates;"

U.S. Patent Application No. 2006/230,014 (Amit et al.) entitled "Method and system for compression of files for storage and operation on compressed files;"

U.S. Patent Application No. 2006/190,643 (Amit et al.) entitled "Method and system for compression of data for block mode access storage."

Data stored in plaintext is open to potential malicious use (e.g. unauthorized access, misuse, theft, etc.), and known in the art solutions for perimeter and/or access control (e.g. firewalls, Virtual Private Networks, LUN masking control and zoning in SAN storage networks, NAS security control features, etc.) still leave security vulnerabilities. Encrypting data to be stored may considerably reduce security threats; such encryption may be provided by using different algorithms known in the art. The problem of providing encryption of storing data with minimal impact on data accessibility and manageability has been recognized in the Prior Art and various systems have been developed to provide a solution, for example:

U.S. Pat. No. 5,235,641 (Kakuse et al.) entitled "File encryption method and file cryptographic system;"

US Patent Application No. 2004/153,642 (Avida et al.) entitled "Encryption based security system for network storage;"

US Patent Application No. 2005/204,154 (Osald) entitled "Method and apparatus for cryptographic conversion in a data storage system."

The problem of providing compression of logical data objects combined with encryption thereof also has been recognized in the Prior Art and various systems have been developed to provide a solution, for example:

U.S. Pat. No. 5,285,497 (Thatcher) entitled "Methods and apparatus for scrambling and unscrambling compressed data streams;"

U.S. Pat. No. 6,122,378 (Yoshiura et al.) entitled "Method and device for compressing and ciphering data;"

U.S. Pat. No. 6,154,542 (Crandall) entitled "Method and apparatus for simultaneously encrypting and compressing data;"

U.S. Pat. No. 6,157,720 (Yoshiura et al.) entitled "Method and apparatus for encrypting data;"

U.S. Patent Application No. 2004/218,760 (Chaudhuri) entitled "System and method for data encryption and compression;"

U.S. Patent Application No. 2004/264,698 (Oda) entitled "Data encrypting device, data decoding device, image data storing device and image forming apparatus;"

GB Patent Application No. 2,315,575 (Mansour et al.) entitled "Encryption circuit in I/O subsystem."

SUMMARY OF THE INVENTION

In accordance with certain aspects of there present invention, there is provided a method of encrypting a plaintext logical data object for storage in a storage device operable with at least one storage protocol and a system thereof. Said method comprising:

in response to a respective request, creating in the storage device a encrypted logical data object comprising a header and one or more allocated encrypted sections with predefined size;

processing one or more sequentially obtained chunks of plaintext data corresponding to the encrypting plaintext logical data object thus giving rise to the processed data chunks, wherein at least one of said processed data chunks comprises encrypted data resulting from said processing;

sequentially accommodating the processed data chunks into said encrypted sections in accordance with an order said chunks received, and facilitating mapping between the data in the plaintext logical data object and the data accommodated in the encrypted sections.

In accordance with further aspects of the present invention, the mapping is provided with a help of at least one index section constituting a part of the encrypted logical data object, said index section comprising at least one entry holding at least information related to processed data chunks accommodated in at least one encrypted section and indication of physical storage location pertaining to said encrypted section.

In accordance with further aspects of the present invention, data chunks accommodated in different encrypted sections are encrypted with the help of different secure keys.

In accordance with further aspects of the present invention, the encryption comprises:

breaking data in a plaintext data chunk into plaintext fixed-size segments; and encrypting each said segment of the plaintext data chunk into encrypted segment with a fixed-size, said encrypted segments constituting corresponding encrypted data chunk.

In accordance with further aspects of the present invention, the encryption comprises:

obtaining at least one initial initialization vector; and encrypting the plaintext chunks with the help of a security key combined with initial initialization vector and/or derivatives thereof, wherein the security key is the same for data chunks accommodated into the same encrypted section.

In accordance with further aspects of the present invention the processed data chunks are accommodated in a log form, wherein a log of a processed data chunk comprises a log header containing information in respect of an offset of the plaintext data chunk within the plaintext logical data object, size of said plaintext chunk, and an identifier allowing associating the log with the encrypted section accommodating the log.

In accordance with further aspects of the present invention, the index section comprises at least one entry associated with at least one encrypted section, the entry comprising at least one indicator to physical storage location of the encrypted section and one or more log records related to the respective logs accommodated in the encrypted section and comprising information facilitating mapping between the data in the plaintext logical data object and the data accommodated in the encrypted sections.

In accordance with further aspects of the present invention, each encrypted section is associated with a flag indicating a use/re-use condition of respective physical location of the encrypted section, and each processed data chunk is associated with the same flag as the encrypted section accommodating the chunk.

In accordance with other aspects of the present invention there is provided a system operable in a storage network and being configured to perform the method stages above. The system may be a part of communication device; a storage device; a stand-alone system capable of encrypting a plaintext logical data object for storage and operatively coupled to the storage device in a serial manner, said system acting as a transparent bridge in respect to the storing data; etc.

In accordance with other aspects of the present invention, there is provided a method of writing a data range to the encrypted logical data object, said method comprising:

in response to respective request, processing one or more sequentially obtained chunks of plaintext data corresponding to said data range, wherein at least one of the processed data chunks comprises encrypted data resulting from said processing;

sequentially accommodating the processed data chunks in accordance with the order these and previous chunks received; and updating the mapping in a manner facilitating one-to-one relationship between the data in the range and the data to be read from the data chunks accommodated in the encrypted logical object.

In accordance with further aspects of the present invention updating the index section comprises:

adding information related to all new data chunks, said information related to the offset and size of the respective plaintext data chunks, and updating the previous obtained information related to live and/or outdated data corresponding to the range.

In accordance with other aspects of the present invention, there is provided a method of reading a data range from a encrypted logical object, said method comprising:

in response to respective request, discovering all created and/or last-updated entries in the index section related to the data within the range;

decrypting one of the encrypted sections corresponding to the discovered entries, and extracting the data to be read in accordance with the mapping provided by the entries;

repeating the above step to one or more other encrypted sections corresponding to the discovered entries until extracting all data from the range; and arranging the extracted data in accordance with their order in the range.

In accordance with other aspects of the present invention, there is provided a method of optimization of the encrypted logical data object, said optimization including:

identifying one or more encrypted sections comprising more than certain percent of outdated data thus giving rise to outdated encrypted sections;

decrypting the identified outdated sections and extracting live data;

encrypting the extracted live data and sequentially accommodating in the active section as one or more new processed chunks; and releasing the outdated encrypted sections from the encrypts logical data object.

In accordance with other aspects of the present invention, there is provided a method of recovery a encrypted logical data object, said method comprising:

initiating a recovery process upon recognizing a recovery status when opening a logical data object;

inspecting the transformed logical object in order to find one or more unmapped encrypted sections, wherein unmapped encryption section comprises at least one unmapped processed data chunk;

sequentially decrypting in reversed order the processed data chunks comprised in said unmapped encrypted sections, starting from the last processed data chunk until a data chunk with an opposite flag is found;

generating an index section with one or more entries corresponding to the decrypted processed data chunks; and re-processing the decrypted chunks and providing indication of successful recovery.

In accordance with other aspects of the present invention, there is provided a method of encrypting a plaintext logical data object for storage in a storage device operable with at least one storage protocol, said method comprising:

in response to a respective request, creating in the storage device a encrypted logical data object comprising a header and one or more allocated encrypted sections with predefined size;

encrypting one or more sequentially obtained chunks of plaintext data corresponding to the plaintext logical data object thus giving rise to the encrypted data chunks; and sequentially accommodating the processed data chunks into said encrypted sections in accordance with an order said chunks received, wherein said encrypted sections serve as atomic elements of encryption/decryption operations during input/output transactions on the logical data object.

Said method further comprises enabling for each encrypted section substantial identity between data could be obtained from said encryption section if being decrypted and the data in the respective plaintext data chunks accommodated in said section as a result of said encrypting.

In accordance with other aspects of the present invention there is provided a system operable in a storage network and being configured to perform the methods above. The system may be a part of communication device; a storage device; a stand-alone system capable of encrypting a plaintext logical data object for storage and operatively coupled to the storage device in a serial manner, said system acting as a transparent bridge in respect to the storing data; etc.

In accordance with other aspects of the present invention, there is provided a system capable of encrypting a plaintext logical data object for storage in a storage device operable with at least one storage protocol, said system comprising:

means for creating in the storage device a encrypted logical data object comprising a header and one or more allocated encrypted sections with predefined size;

means for processing one or more sequentially obtained chunks of plaintext data corresponding to the encrypting plaintext logical data object thus giving rise to the processed data chunks, wherein at least one of said processed data chunks comprises encrypted data resulting from said processing;

means for facilitating sequentially accommodating the processed data chunks into said encrypted sections in accordance with an order said chunks received; and means for facilitating mapping between the data in the plaintext logical data object and the data accommodated in the encrypted sections.

In accordance with other aspects of the present invention, there is provided a method of encrypting sequential plaintext chunks to be stored as encrypted logs in a storage device operable with at least one storage protocol, said encrypting provided with a help of encryption engine operating data segments with fixed size, the method comprising:

dividing a first plaintext chunk into two parts thus giving rise to a primary part and a tail part, wherein the primary part comprises sequential data starting from the offset of said first chunk and having size defined as a multiple of said fixed size, and the tail part comprises the rest data of said first chunk, said rest of the data less than said fixed size;

encrypting the primary part with a secure key and accommodating the results in the storage device as an encrypted log, thus giving rise to a first primary log;

processing the tail part and accommodating the results in the storage device sequentially after the primary log, thus giving rise to a first tail log;

obtaining a next plaintext chunk;

obtaining the plaintext data from the first tail log, adding them at the beginning of said next chunk, and dividing the result in a primary part comprising sequential data starting from the offset of said obtained plaintext data and having size defined as a multiple of said fixed size, and the tail part comprises the rest data of said next chunk, said rest of data less than said fixed size;

encrypting the primary part with said secure key in a next primary log, said next primary log to be accommodated at a position after the first primary log; and processing the tail part and accommodating the results in the storage device sequentially after said next primary log.

BRIEF DESCRIPTION OF THE DRAWINGS

In order to understand the invention and to see how it may be carried out in practice, certain embodiments will now be described, by way of non-limiting example only, with reference to the accompanying drawings, in which:

FIG. 1 is a schematic block diagram of typical storage network architecture as is known in the art;

FIGS. 6a and 6b are schematic diagrams illustrating update of the transformed logical data object in accordance with certain embodiments of the present invention;

FIG. 7 is a generalized flowchart of creating transformed logical data object in accordance with certain embodiments of the present invention;

FIG. 11b, there a schematic diagram of index section comprising time stamps in accordance with certain embodiments of the present invention.

DETAILED DESCRIPTION OF THE DRAWINGS

Figure 2A:
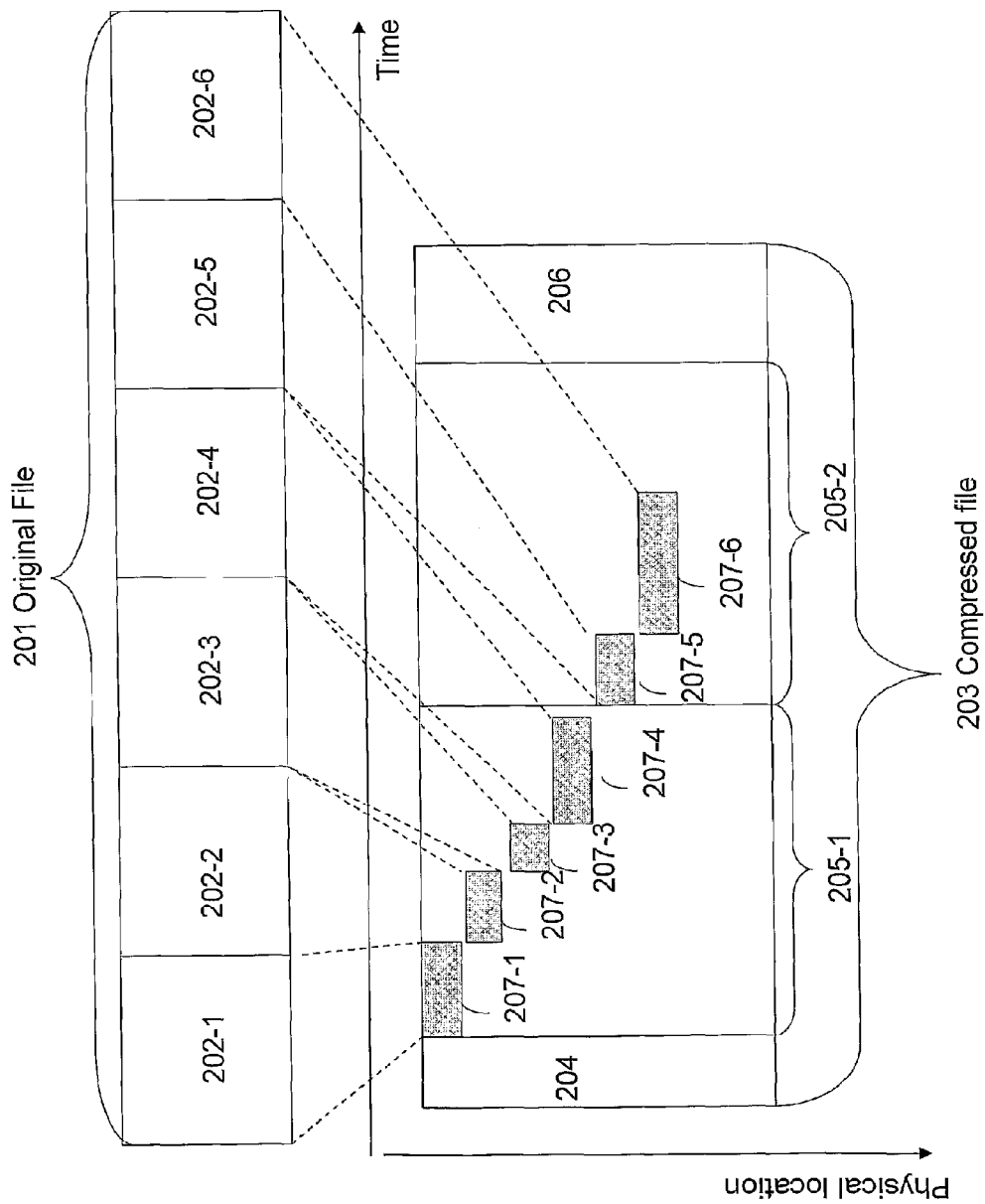
FIGS. 2a and 2b are schematic diagrams of raw and compressed logical data objects in accordance with certain embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions, utilizing terms such as "processing," "computing," "calculating," "determining," "generating," "creating," or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, unit, and device (in single or plural form) for performing the operations herein. This may be specially constructed for the desired purposes, or it may comprise a general-purpose computer selectively activated or reconfigured by a computer program stored in the computer. Such a computer program may be stored in a computer readable storage medium such as, but not limited to, any type of disk including, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus, unless specifically stated otherwise. Various general-purpose systems may be used with programs in accordance with the teachings herein, or it may prove convenient to construct a more specialized apparatus to perform the desired method. The desired structure for a variety of these systems will appear in the description below. In addition, embodiments of the present invention are not described with reference to any particular programming language. It will be appreciated that a variety of programming languages may be used to implement the teachings of the inventions as described herein.

The references cited in the background teach many principles of encryption and compression that are applicable to the present invention. Therefore the full contents of these publications are incorporated by reference herein where appropriate for appropriate teachings of additional or alternative details, features and/or technical background.

The term "criterion" used in this patent specification should be expansively construed to cover any compound criterion, including, for example, several criteria and/or their combination.

The term "logical data object (LO)" used in this patent specification should be expansively construed to include any types and granularities of data units used in a computing system and handled as one unit (e.g. data files, archive files, image files, database files, memory data blocks, stream data blocks, etc.).

Bearing this in mind, attention is drawn to FIG. 1 illustrating a schematic diagram of typical storage network architectures as known in the art. The logical data objects (LO) from clients 11 and/or servers 12 are transferred via network 13 to storage device(s) 14 (e.g. specialized NAS file servers, general purpose file servers, SAN storage, stream storage device, etc.). The network comprises one or more communication devices 15 (e.g. switch, router, bridge, etc.) facilitating the data transfer. The storage in the illustrated network may be wholly or partly implemented using block mode access and/or file mode access storage protocols. In file mode access the logical data objects (LOs) are constituted by files, and the network is IP network (e.g. local area network (LAN), wide area network (WAN), combination thereof, etc.). In block mode access embodiments, the logical data objects are constituted by data blocks and the network is Storage Area Network (SAN) implementing, for example, Fiber Channel or iSCSI protocols. In certain embodiments the storage device 14a may be directly connected to a server 12 via block mode access storage protocols (e.g. SCSI, Fiber Channel, etc.). Such Direct Access Storage includes, for example, the internally attached local disk drives or externally attached RAID (redundant array of independent disks) or JBOD (just a bunch of disks), etc.

At least part of the logical data objects may be stored in a transformed form (e.g. a compressed form and/or an encrypted form). Accordingly, they may be transformed (e.g. compressed/decompressed and/or encrypted/decrypted) on a physical or logical communication route between the clients/ servers and the storage location. The transformation or part thereof may be provided, for example, by the server 12, communication device 15, by a transformation system 16 operatively coupled to the clients/servers and the storage device, by the storage device 14, etc. Typically the secure keys used for encryption are held separately from the device providing encryption and/or storage, for example, they may be held at a key holding platform 17 operatively coupled with the transformation platform 16. Likewise, coding tables and similar external data involved in the transformation process may be held separate from the processing and/or storage devices.

Note that the invention is not bound by the specific architecture described with reference to FIG. 1. Those versed in the art will readily appreciate that the invention is, likewise, applicable to any computing systems and any storage network architecture facilitating transformation of one or more logical data objects on a physical and/or logical route between a computer sending data access request to the logical data object and a storage location of the appropriate transformed data, including embodiments wherein transformation (e.g. compression and/or encryption) and storage are provided at the same physical location.

Figure 2B:
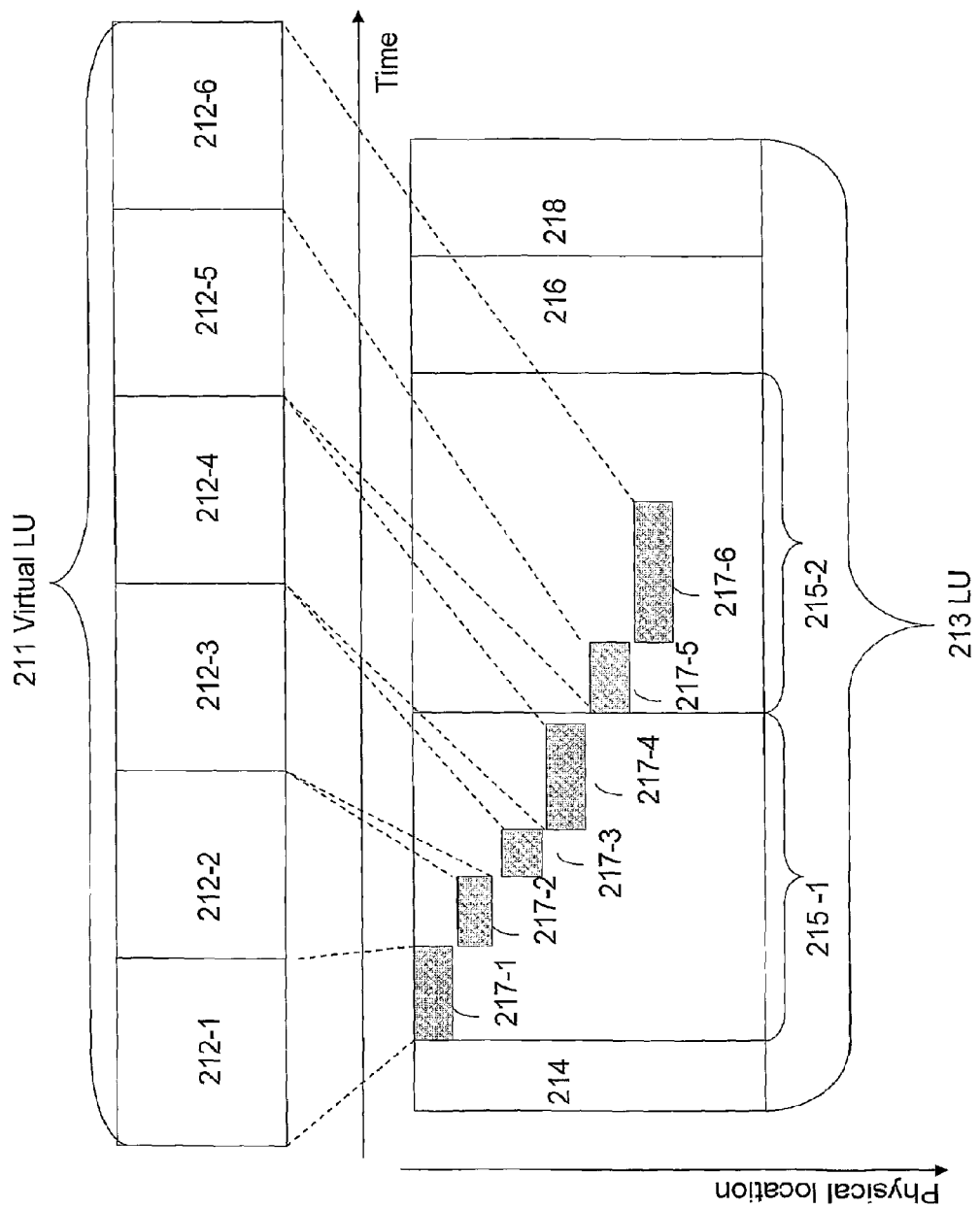

FIGS. 2a-2b, 3a-3b, and 4a-4d illustrate schematic diagrams of original and transformed logical data objects in accordance with certain embodiments of the present invention. The transformation may comprise compression, encryption, encoding, conversion, etc. and/or combinations thereof. The transformation illustrated in FIGS. 2a-2b is compression of logical data objects, in FIGS. 3a-3b—encryption of logical data objects, and in FIGS. 4a-4d the illustrated transformation includes a combination of compression and encryption. For purpose of illustration only the following description is made with respect to processing logical data objects by the transformation system 16, writing the processed data to the storage device 14, reading the data to be de-transformed (e.g. decrypted, decompressed, etc.) from the storage device, and de-transforming them by the transformation system 16. It should be noted, however, that the present invention is applicable in a similar manner to transformation/de-transformation provided by any purpose device operatively located on a physical and/or logical route between a computer sending access-related request (e.g. open, read, write, etc.) to the LO and a storage location of appropriate transformed data (including the end points of said route). The described functionalities of the transformation system may be provided in different ways. For example, the transformation system 16 may be integrated in one or more said devices "inter alias," the functionality of the transformation system may be implemented in one or more specialized boards, distributed (fully or partly) between other modules of at least one device, etc. The integration may be provided in a different manner and implemented in software and/or firmware and/or hardware. The integration may be provided with any storage network elements (for example, file servers, enterprise and network switches, routers, storage devices, etc.), etc.

Also it should be noted that the invention is, likewise, applicable to writing the processed data in a memory of any device on said route and later forwarding the entire transformed LO or parts thereof for storing at a storage location, as well as for forwarding the transformed data to be read from the storage location to any device on said route and further de-transformation.

For purpose of illustration only, the following description is made with respect to an adaptive dictionary-based data compression algorithm (e.g. Lempel-Ziv). It should be noted that the invention is not bound by this algorithm and is, likewise, applicable to any other sequential data compression algorithm. Among advantages of certain embodiments using the adaptive dictionary-based compression algorithm, is gaining compression/decompression performance.

Also for purpose of illustration only, the following description is made with respect to a block cipher using secret-key symmetric algorithm (e.g. IDEA—International Data Encryption Algorithm). It should be noted that the invention is not bound by this algorithm and is, likewise, applicable to any other, symmetric or asymmetric, encryption algorithm capable to break a block of plaintext data into segments and to transform each plaintext segment of the block into a segment of ciphertext.

FIGS. 2a, 3a, 4a and 4b illustrate schematic diagrams of original and transformed logical data objects in accordance with certain embodiments of the present invention for file mode access. The transformation system 16 is configured to intercept file call operations (file access-related requests) as well as some control transactions (e.g. set end of file) and to act as a proxy on certain transactions (e.g. keeping the throughput on most control transactions and proxy on data transactions and certain control transactions). The transformation system is capable of deriving and processing data corresponding to the intercepted file access-related request, facilitating communication with and/or within the file system for storing the processed data at the storage medium as at least one transformed file and/or facilitating de-transformation of at least part of the processed data corresponding to the intercepted file request. During "write" operation on the files to be processed for storage, the transformation system 16 receives from the clients 11 and/or the servers 12 through the network 13 data corresponding to said files, transforms the data and facilitates writing at the file storage device 14. A "read" operation proceeds in reverse direction; the required files are retrieved by the transformation system, de-transformed (partly or entirely, in accordance with required data range) and sent to the appropriate client/server. When appropriate, the transformation system is capable to communicate with the external platform (e.g. keys holding platform 17) for obtaining external data involved in the transformation process (e.g. secure keys and/or secure value or other metadata thereof involved in the transformation).

FIGS. 2b, 3b, 4c and 4d illustrate schematic diagrams of original and transformed logical data objects in accordance with certain embodiments of the present invention for block mode access. As known in the art, typical storage systems and networks are able to recognize the divided organization of storage. A storage disk or a set of disks may be conceptually divided into logical unit(s). The storage logical units (LU) can directly correspond to volume drive, to host application, storage device, etc. and constitute a logical representation of physical storage. Each logical unit has an address, known as the logical unit number (LUN), which allows it to be uniquely identified. Users can determine whether a LUN is a disk drive, a number of disk drives, a partition on a disk drive, combinations thereof, etc. In certain embodiments of the present invention, one or more LUs accommodate transformed data, while the transformation system is configured to create in respect to the storage logical units corresponding virtual logical units (VLUs) arranged to virtually represent in a non-transformed form the data stored in the storage logical unit (i.e. the original data); intercept data access-related requests addressed to the storage logical unit and address said request to the virtual logical unit; and facilitate mapping between the transformed data and their non-transformed virtual representation at the virtual logical unit. Thus, in accordance with certain aspects of the present invention, the computer's operating system (OS) will relate to the VLU as a virtual representation of non-transformed data (original LO).

The ratio between the sizes of VLU and LU may be pre-defined and/or be adaptable during the transformation process. For example, as will be further detailed with reference to FIG. 2b for the case of compressing transformation, the ratio between the size of LU and VLU may be defined in accordance with the expected compression rate (e.g. the size of the virtual logical unit may correspond to an estimated size of raw data which, being compressed, would substantially amount to the size of the storage logical unit) and adapted in accordance with real compression ratio.

For purpose of illustration only, the following description is made with respect to certain embodiments wherein each chunk of original data is transformed when it arrives and is written to the storage location in the transformed form substantially without keeping data in a cache and independently of processing the other received chunks. It should be noted that the invention is, likewise, applicable, for example, when the received chunks are combined or segmented before processing and/or before writing in the storage device (e.g. in accordance with size criterion). The size of data to be transformed and the size of transformed data to be written as one portion (and/or size of original data to be written as one portion) may be configurable per certain criteria (e.g. per size of I/O buffer of the transformation system and/or storage device, characteristics of transformation engine, configurable runtime, characteristics of the storage network, type of incoming and outgoing traffic, etc.). The transformation system may provide acknowledgment of writing data to the storage location in different modes, e.g. per each written portion, per predefined/configurable number of portions, per predefined/configurable runtime, etc. depending, for example, on protocols of storage network and traffic thereof. It should be also noted that in certain embodiments of the present invention (e.g. as further detailed with reference to FIG. 7) data chunks fitting certain criterion may be stored in non-transformed form resulting from transformation failure or omitting the transforming processing.

Bearing this in mind, attention is drawn to FIG. 2a illustrating a schematic diagram of raw and compressed logical data objects in accordance with certain embodiments of the present invention for file mode access. The chunks of data (202-1-202-6) comprised in uncompressed LO (raw file 201 in the illustrated embodiment) are sequentially processed into compressed data chunks (207-1-207-6) to be accommodated into blocks 205-1, 205-2 (hereinafter referred to as compressed sections (CS)) with a predefined size. It should be noted that, as will be further detailed with reference to FIG. 7, some chunks of the processed data may be accommodated in non-compressed form if they do not meet certain criterion (e.g., when an obtainable compression ratio less than a predefined value, etc.).

Said compressed sections serve as atomic elements of compression/decompression operations during input/output transactions on the files. The compression processing is provided in a manner enabling substantial identity between a decompressed compression section and the original data accommodated in said section as result of compression (e.g. in the illustrated example data resulting of decompressing the compressed section 205-1 will be substantially identical to the original data comprised in the chunks 202-1, 201-2 and 201-3).

The size of the compressed sections may be configurable; larger compressed sections provide lower processing overhead and higher compression ratio, while smaller compressed sections provide more efficient access but higher processing overhead. The size of the compressed section may be predefined also in accordance with a certain time-related criterion (e.g. estimated time necessary to compress data which, being compressed, would substantially amount to the compressed section size, etc.).

In certain embodiments of the invention the predefined size of the sections may be equal for all compressed sections (e.g., by way of non-limiting example, the compressed sections may have equal size of 1 MB). Alternatively, in certain embodiments of the invention, the predefined size may vary for different compressed sections. For example, each type of data (e.g. text, image, voice, combined, etc.) or logical data objects may correspond to predefined size of the compressed section, and the transformation system during compression may select the appropriate size of the compressed section in accordance with data type dominating in the respective portion of the raw file being compressed (and/or type of LO). Optionally, the compression process may include adaptive capabilities, providing, for example, optimized compression algorithm for compressed data chunks accommodated in different compressed sections (e.g. different compression algorithms best suited for sections with dominating voice, text, image, etc.).

The real total size of the compressed data accommodated in the compressed section may be less than the predefined size of the compressed section as will be further described with reference to FIG. 9.

In accordance with certain embodiments of the present invention, the processed chunks (207-1-207-6) are accommodated in the compressed sections according to the order of receiving the respective incoming chunks (202-1-202-6), said accommodation may be provided in log form, journal form, or other form of sequential accommodation. The compressed LO (compressed file 203 in the illustrated embodiment) comprises a header 204, one or more compressed sections 205 and one or more index sections (IS) 206. The header 204 of the compressed file comprises a unique file descriptor, a flag indicating that the file is currently open (or a recovery status), information about the size of the raw file 201, and, optionally, a signature indicating whether the file was processed by the transformation system 16 (also for files which were not compressed by the transformation system as not fitting certain criterion, e.g., because of obtainable compression ratio less than a predefined value), etc. In certain embodiments of the invention the header may have a fixed length. The header and index sections will be further detailed with reference to FIGS. 5-10.

In other embodiments of the present invention (e.g. in certain embodiments where compressed/decompressed functionalities are integrated with the storage device, etc.) the header 204 or any of its parts and combinations thereof may constitute a part of the file system. For example, a file identifier used in a certain file system (e.g. node ID) may be used as the unique file descriptor of the compressed file, a file record in the file system may be modified and comprise additional fields, e.g. for information about the size of the raw file, said signature, etc. The index section or parts thereof may also constitute a part of the file system.

FIG. 2b illustrates a schematic diagram of raw and compressed logical data objects in accordance with certain embodiments of the present invention for the block mode access. The chunks of data comprised in uncompressed (raw) LO are sequentially processed into compressed data chunks (217-1-217-6) to be accommodated into blocks 215-1, 215-2 (hereinafter referred to as compressed sections) with a predefined size and similar to compressed sections described with reference to FIG. 2a. Said uncompressed chunks corresponding to the processed data chunks (217-1-217-6) are virtually represented in the VLU 211 as data chunks (212-1-212-6). The compressed sections serve as atomic elements of compression/decompression operations during input/output transactions (data access-related requests) on the data blocks. The ratio between the sizes of VLU and LU may be predefined in accordance with certain criteria (e.g. per dominating type of data in the compressing data block, per maximal or minimal compression ratio obtainable for said data, etc.) or be adaptable during the compression process. By way of non-limiting example, in certain embodiments of the present invention the ratio between size of VLU and LU is estimated as 3 for e-mails, as 8 for a text formatted data, etc. In certain cases the real ratio between the compressed and raw data may be (and/or become) less than the estimated ratio. This difference may cause an overflow of the storage logical unit, as the computer's operating system (OS) will relate to the VLU still representing free space when the LU is, actually, full up. Accordingly, the transformation system 16 may be configured to detect the upcoming overflow event (e.g. by determining the actual compression rate and the free space in LU, etc.) and to facilitate enlarging the storage logical unit by predefined or calculated space if free capacity in LU does not match certain criterion (e.g. less than a predefined size). The transformation system is further configured to detect a failure of said LU enlarging (e.g. because of unavailable additional disk space, inability of the storage device to support the dynamic LU changes, etc.), change the access status of the LU to 'read only', and to keep this status until the free capacity in the LU matches the above criteria. Similar, the transformation system may be configured to facilitate releasing of free space in LU if the real ratio between the compressed and raw data is higher than the estimated ratio.

Likewise described with reference to FIG. 2a, the compressed chunks are accommodated in the compressed sections according to the order of receiving the respective incoming chunks; said accommodation may be provided in log form, journal form, or other form of sequential accommodation. The compressed LO (LU 213) comprises a header 214, one or more compressed sections 215, an index section 216 and a free space 218. The header 214 comprises a unique descriptor containing a logical unit number (LUN), the size of the virtual logical unit (VLU), the size of LU (optionally), an open/recovery flag, a signature indicating whether at least part of the storing data were processed by the transformation system 16, etc. The header may have a fixed length (e.g., by way of non-limiting example, 24 bytes including 4 bytes for the signature, 16 bytes for the unique descriptor, 4 bytes for the info about size of the corresponding virtual logical unit).

In other embodiments of the present invention (e.g. in certain embodiments when compressed/decompressed functionalities are integrated with the storage device, etc.) the header 214 or any of its parts and combinations thereof may constitute a part of disk attributes, the index section 216 may constitute a part of the disk attributes, etc.

Thus, chunks of data comprised in the original logical data object (LO) of any type are sequentially compressed and accommodated in the received order in one or more compressed sections with predefined size. The compression processing is configured in a manner enabling substantial identity between compression section if being decompressed and the original data accommodated in said section as a result of compression. The chunks accommodated in the same compressed section are compressed using the same dictionary. As will be further detailed with reference to FIG. 6, the information in the index section facilitates one-to-one relationship between each point in the original data range and the data to be read from the logs after de-transformation. The compressed data chunks are moved to the storage location in a "sync-flush" mode enabling all pending output to be flushed to the output (storage) buffer without a reset of compression operation. Thus sync flushing of the compression buffer enables using the same dictionary within the compressed section whilst facilitating data integrity. Sync-flush may be implemented in different ways, some of them known in the art (e.g. by applying Z_SYNC_FLUSH parameter in deflate/inflate functions provided in ZLIB compression library, ZLIB.H—interface of the 'zlib' general purpose compression library, version 1.2.3, Jul. 18, 2005, Copyright (C) 1995-2005 Jean-Loup Gailly and Mark Adler).

In certain embodiments of the invention the initial k bytes of the data to be compressed are used as a dictionary. The same dictionary is further used for compression of the entire first and subsequent chunks of sequential data to be processed/compressed and accommodated in a compressed section, while the dictionary is adapted in accordance with processed data, e.g. per Lempel-Ziv algorithm. The process continues until the total size of the compressed data substantially achieves the predefined size of the compressed section. The next chunk of compressed data will be accommodated in a subsequent compressed section. The initial k bytes in said next chunk will be used for renewing the dictionary to be used for compressing the data accommodated in said subsequent compressed section. In certain embodiments of the invention a new compression sequence started in the new compressed section may use the same initial compression dictionary as the previous sequence.

In certain embodiments of the invention the dictionaries corresponding to data in different compressed sections may be maintained as an entire dictionary comprising certain pointers to appropriate compressed sections. This entire dictionary may be accommodated in one or more index sections or be distributed between different index sections and/or compressed sections. Alternatively, the dictionary may be divided into several separately managed dictionaries corresponding to one or more compressed sections. In certain embodiments the index section may accommodate one or more dictionaries corresponding solely to data in the compressed sections associated with said index section. In some embodiments each compressed section may comprise a dictionary related to the data stored in the section.

In certain embodiments of the invention each received portion of raw data is received, processed, compressed if it fits certain criteria, and written to the storage location almost without keeping data in a cache, and independently of processing the other received portions. In other embodiments of the present invention several received portions may be processed together and written in the storage device as one compressed portion.

Among advantages of certain embodiments of the present invention is the ability to process and write relatively small chunks of data wherein obtaining capabilities of compression over a relatively large volume of data (compressed section);

as well as enhanced compression ratio facilitated by sequential compression of data chunks using the same adaptive dictionary.

Figure 3A:
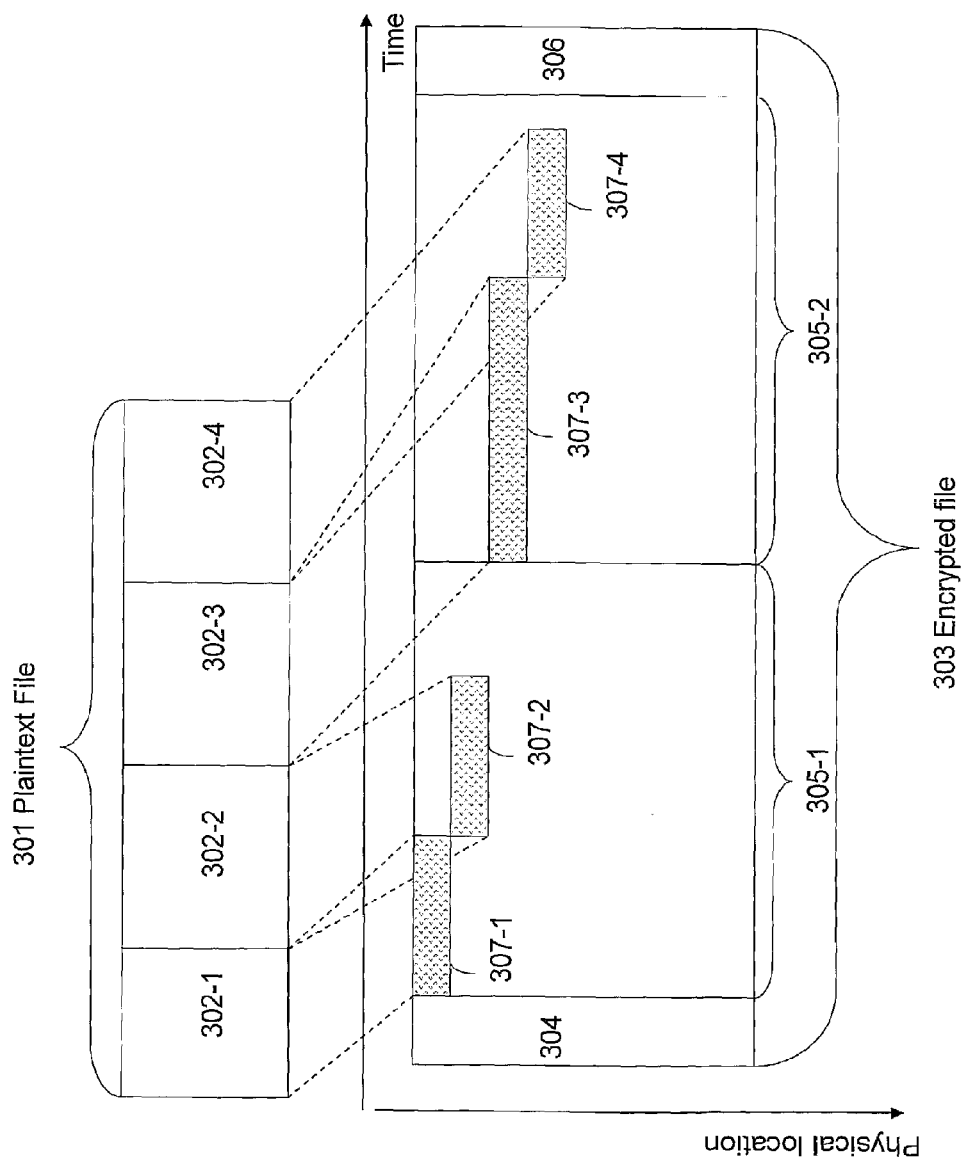
FIGS. 3a and 3b are schematic diagrams of plaintext and encrypted logical data objects in accordance with certain embodiments of the present invention.

FIG. 3a illustrates a schematic diagram of original and encrypted logical data objects in accordance with certain embodiments of the present invention for file mode access. The chunks of data (302-1-302-4) comprised in a plaintext LO (plaintext file 301 in the illustrated embodiment) are sequentially processed into encrypted data chunks (307-1-307-4) to be accommodated into blocks 305-1, 305-2 (hereinafter referred to as encrypted sections (ES) with a predefined size. It should be noted that, as will be further detailed with reference to FIG. 7, some chunks of the processed data may be accommodated in non-encrypted form if they do not meet certain criterion.

Similar to the compression sections described with reference to FIGS. 2a and 2b, said encrypted sections serve as atomic elements of encryption/decryption operations during input/output transactions on the files. The size of the encrypted sections may be configurable; smaller encrypted sections provide more efficient access but higher processing overhead. In certain embodiments of the invention the predefined size may be equal for all encrypted sections (e.g., by way of non-limiting example, the encrypted sections may have an equal size of 1 MB). Alternatively, in certain other embodiments of the invention, the predefined size of the encrypted sections may vary. For example, each type of data may correspond to predefined size of the encrypted section, and the transformation system during encryption may select the appropriate size of the encrypted section in accordance with data type dominating in the respective chunk (or a group of chunks) of the plaintext file being encrypted.

In accordance with certain embodiments of the present invention, the processed/encrypted chunks (307-1-307-4) are accommodated in the encrypted sections in accordance with the order of receiving respective chunks of plaintext data, said accommodation may be provided in log form, journal form, etc. The encrypted LO (encrypted file 303 in the illustrated embodiment) comprises a header 304, one or more encrypted sections 305 and one or more index sections (IS) 306. The header 304 of the encrypted file comprises a unique file descriptor, a flag indicating that the file is currently open (or recovery status), information about the size of the plaintext file 301, and, optionally, a signature indicating whether the file was processed by the transformation system 16 (also for files which were not encrypted by the transformation system as not fitting certain criterion, e.g., certain authorization marks, certain type of files, etc.). In certain embodiments of the invention the header may have a fixed length. The header and index sections will be further detailed with reference to FIGS. 5-10.

In other embodiments of the present invention (e.g. in certain embodiments where encrypted/decrypted functionalities are integrated with the storage device, etc.) the header 304 or any of its parts and combinations thereof may constitute a part of the file system. For example, a file identifier used in a certain file system (e.g. node ID) may be used as the unique file descriptor of the encrypted file, a file record in the file system may be modified and comprise additional fields, e.g. for information about the size of the plaintext file, said signature, etc. The index section or parts thereof may also constitute a part of the file system.

Figure 3B:
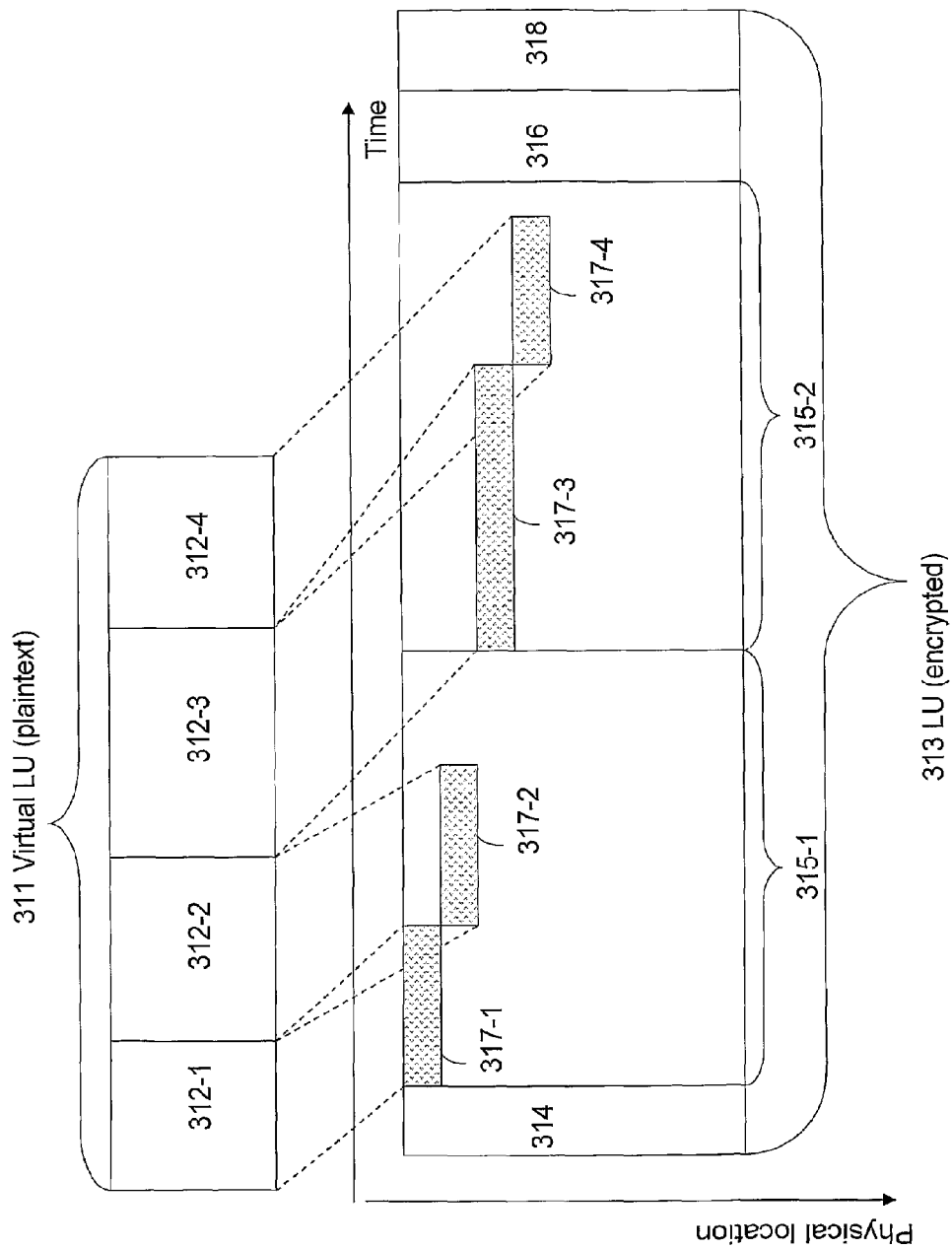

FIG. 3b illustrates a schematic diagram of plaintext and encrypted logical data objects in accordance with certain embodiments of the present invention for block mode access. The chunks of data comprised in plaintext LO are sequentially processed into encrypted data chunks (317-1-317-4) to be accommodated in the received order into blocks 315-1, 315-2 (hereinafter referred to as encrypted sections) with a predefined size and similar to encrypted sections described with reference to FIG. 2a. Said plaintext chunks corresponding to the processed data chunks (317-1-317-4) are virtually represented in the VLU 311 as data chunks (312-1-312-4).

The encrypted LO (LU 313) comprises a header 314, one or more encrypted sections 315, an index section 316 and a flee space 318. The header 314 comprises a unique descriptor containing a logical unit number (LUN), the size of the virtual logical unit (VLU), the size of LU (optionally), an open/recovery flag, a signature indicating whether at least part of the storing data were processed by the transformation system 16, etc. The header and index sections will be further detailed with reference to FIGS. 5-10.

In other embodiments of the present invention (e.g. in certain embodiments when encryption/decryption functionalities are integrated with the storage device, etc.) the header 314 or any of its parts and combinations thereof, and/or the index section 316 may constitute a part of disk attributes.

Thus, chunks of data comprised in the original logical data object (LO) of any type are sequentially encrypted and accommodated in the received order in one or more encrypted sections with predefined size.

The encryption processing is configured in a manner enabling substantial identity between encryption section if being decrypted and the plaintext data accommodated in said section as a result of encryption.

A block cipher encryption algorithm breaks plaintext data in the received chunks into fixed-size segments (e.g. 16 bytes) and encrypts each plaintext segment of the chunk into encrypted segment with fixed-size B. In the illustrated embodiment the transformation system is capable to round, when the encrypted segments, when necessary to said fixed size B (e.g. by entering padding data). The first and subsequent chunks of sequential data are encrypted with the same secure key and accommodated in an encrypted section. The process continues until the total size of the encrypted data substantially achieves the predefined size of the encrypted section. The next chunk of encrypted data will be accommodated in a subsequent encrypted section. The data in different encrypted sections may be encrypted with the same or with different secure keys. Also, as will be further detailed with reference to FIG. 6, the information in the index section facilitates one-to-one mapping between each point in the original data range and the data to be read from the logs after decryption.

Figure 12A:
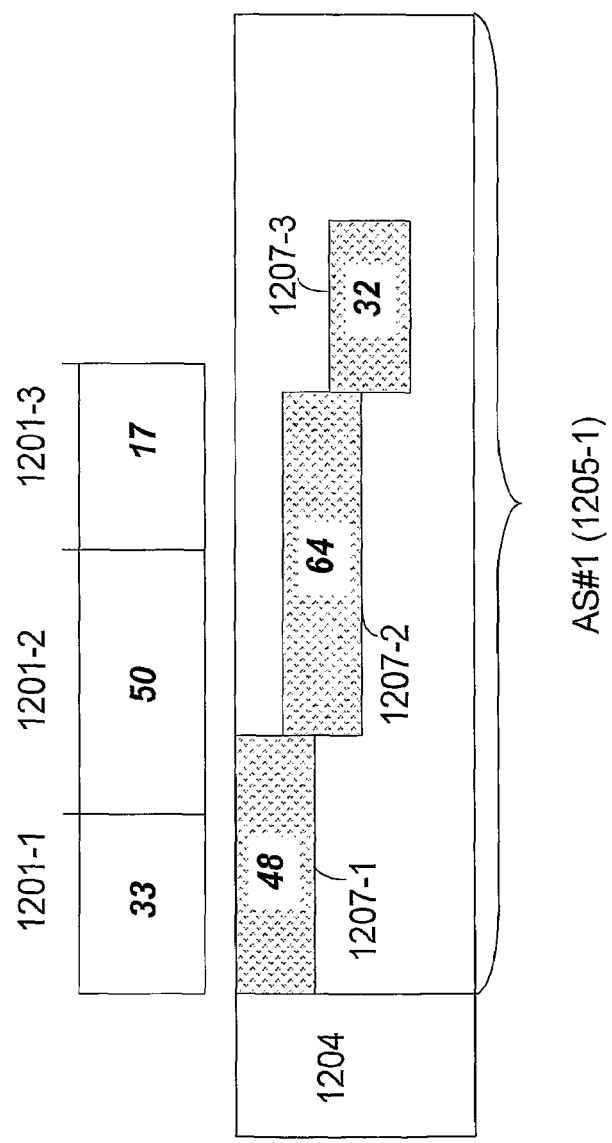
FIGS. 12a-12b are schematic diagrams illustrating non-limiting examples of encryption transformation in accordance with certain embodiments of the present invention.

The encryption process will be further detailed reference to FIGS. 12a) and 12b).

Figure 4A:
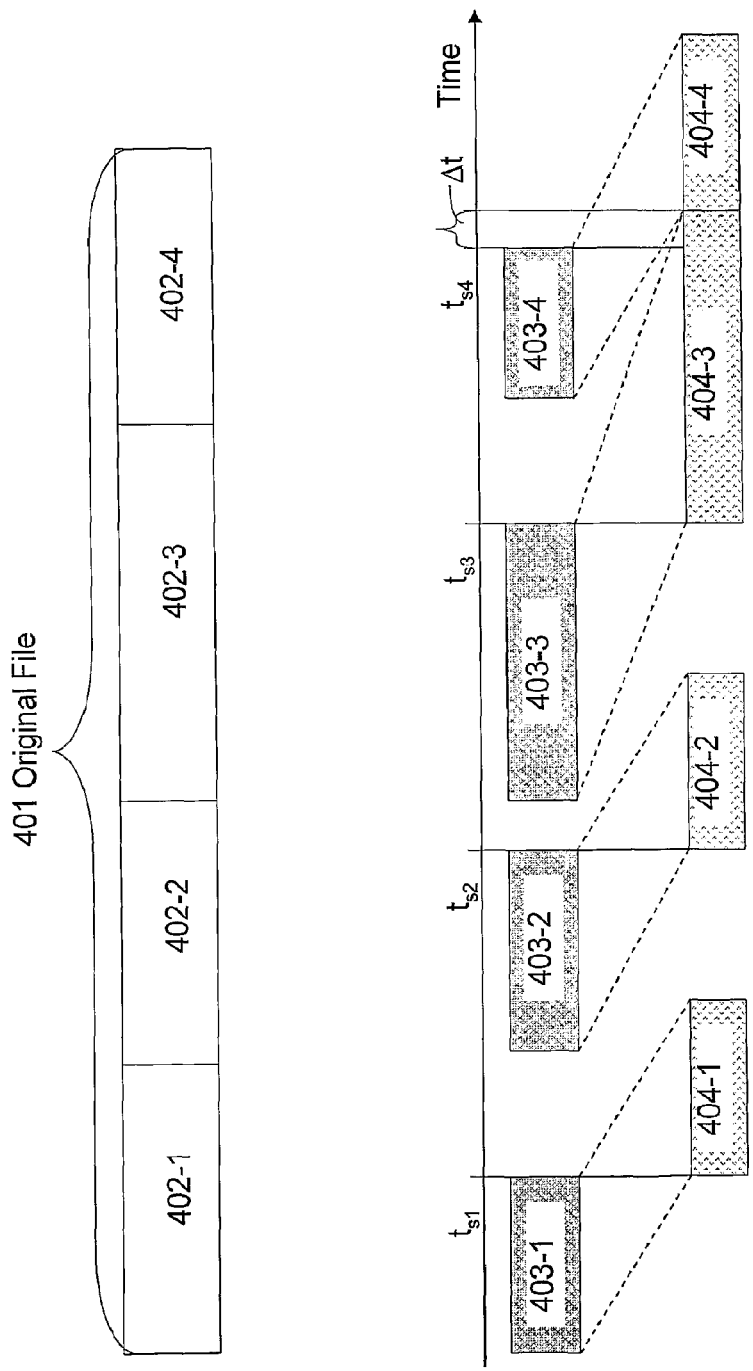
FIGS. 4a-4d are schematic diagrams of original and compressed/encrypted logical data objects in accordance with certain embodiments of the present invention.
Figure 4B:
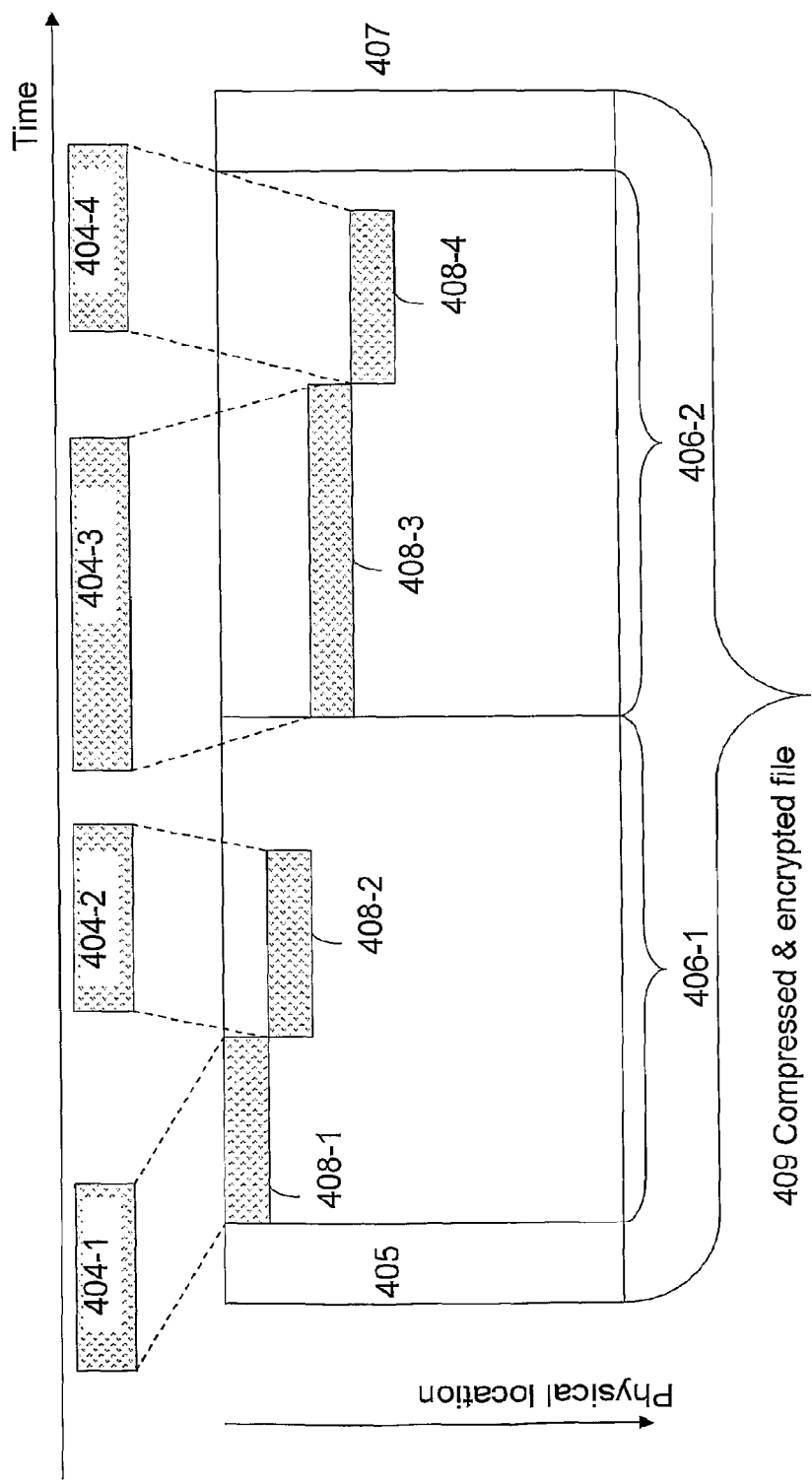

FIGS. 4a-4b illustrate schematic diagrams of original and transformed logical data objects in accordance with certain embodiments of the present invention for file mode access, wherein transformation includes compression and encryption.

The chunks of data (402-1-402-4 illustrated in FIG. 4a) comprised in an original LO (original file 401 in the illustrated embodiment) are sequentially transformed into data chunks (408-1-408-4 illustrated in FIG. 4b) accommodated into blocks 406-1, 406-2 with a predefined size. Similar to compressed sections detailed with reference to FIGS. 2a-2b, and encrypted sections detailed with reference to FIGS. 3a-3b, said blocks serve as atomic elements of compression/decompression and encryption/decryption operations during input/output transactions on the files. In the following description the term "accommodation section (AS)" will be used to any storing block configured to accommodate transformed data chunks (including compressed sections and encrypted sections described above) and serving as atomic elements for transforming/de-transforming operations in accordance with certain embodiments of the present invention. The accommodation sections may have equal predefined size, or, alternatively, during the transformation process the transformation system may select a predefined size for a certain accommodation section in accordance with pre-defined criterion.

Processing the original chunks of data (402-1-402-4) into stored data chunks (408-1-408-4) comprises two processes: 1) compressing the original chunks into compressed data chunks (403-1-403-4), and 2) encrypting the compressed data chunks (403-1-403-4) into encrypted chunks (404-1-404-4) to be accommodated. The processes are synchronized and provided in parallel, i.e. the compression and encryption processes are coordinated with respect to time (synchronized processes) and concurrently execute autonomous sets of instructions (parallel processes) related, respectively, to compression and to encryption, while the compression, the encryption and the accommodation are provided in a manner preserving the sequence of the original chunks.

In the embodiment illustrated in FIG. 4a the synchronization of the processes is characterized by that each output chunk processed in the compression process serves as input chunk in the encryption process. Accordingly, the sequences of compressed and encrypted data chunks correspond to the sequence of the original data chunks. For example, compression of original chunks 402-1-402-3 into compressed chunks 403-1-403-3 finished and encryption of these resulted chunks into encrypted chunks 204-1-204-3 starts at points in time $t_{s1}$-$t_{s3}$ respectively. In the illustrated example the compression of the original chunk 402-4 into compressed chunk 403-4 is finished at $t_{s4}$, while the encryption of the compressed chunk 403-3 into encrypted chunk 404-3 is not finished till this moment. The encryption of the sequential compressed chunk 403-4 into encrypted chunk 404-4 will start after the chunk 404-3 is encrypted (with delay $\Delta t$ after $t_{s3}$ when the compression of the chunk 403-4 is finished).

In certain embodiments of the invention each received chunk of original data is compressed and sent to be encrypted almost without keeping data in a cache and autonomously of processing the other received chunks. In other embodiments of the present invention a received chunk may be segmented or several received chunks may be compressed together and further encrypted as one compressed chunk.

It should be noted that, as will be further detailed with reference to FIG. 7, the processing of chunks fitting certain criterion may include only compression, or only encryption, or neither of them, wherein the sequence of chunks during the processing and accommodation is retained as corresponding to the sequence of the received chunks.

It should be noted that the invention is not bound by the illustrated way of synchronization and is, likewise, applicable to any other form of coordination in time compression and encryption processes, said coordination facilitating preserving the sequence of data chunks.

As illustrated in FIG. 4b, the processed chunks (404-1-404-4) are written to the accommodation sections (stored chunks 408-1-408-4) in accordance with the order of receiving respective chunks of original data. The transformed LO (compressed and encrypted file 409 in the illustrated embodiment) comprises a header 405, one or more accommodation sections 406 and one or more index sections (IS) 407. The header 405 of the transformed file comprises a unique file descriptor, a flag indicating that the file is currently open (or a recovery status), information about the size of the original file 401, and, optionally, a signature indicating whether the file was processed by the transformation system 16 (also for files which were not encrypted and/or compressed) by the transformation system as not fitting certain criterion, e.g., certain authorization marks, certain type of files, certain compression ratio, etc.). In certain embodiments of the invention the header may have a fixed length. The header and index sections will be further detailed with reference to FIGS. 5-10.

In other embodiments of the present invention (e.g. in certain embodiments where encrypted/decrypted and/or compression/decompression functionalities are integrated with the storage device, etc.) the header 405 or any of its parts and combinations thereof may constitute a part of the file system. For example, a file identifier used in a certain file system (e.g. node ID) may be used as the unique file descriptor of the transformed file, a file record in the file system may be modified and comprise additional fields, e.g. for information about the size of the original file, said signature, etc. The index section or parts thereof may also constitute a part of the file system.

Figure 4C:
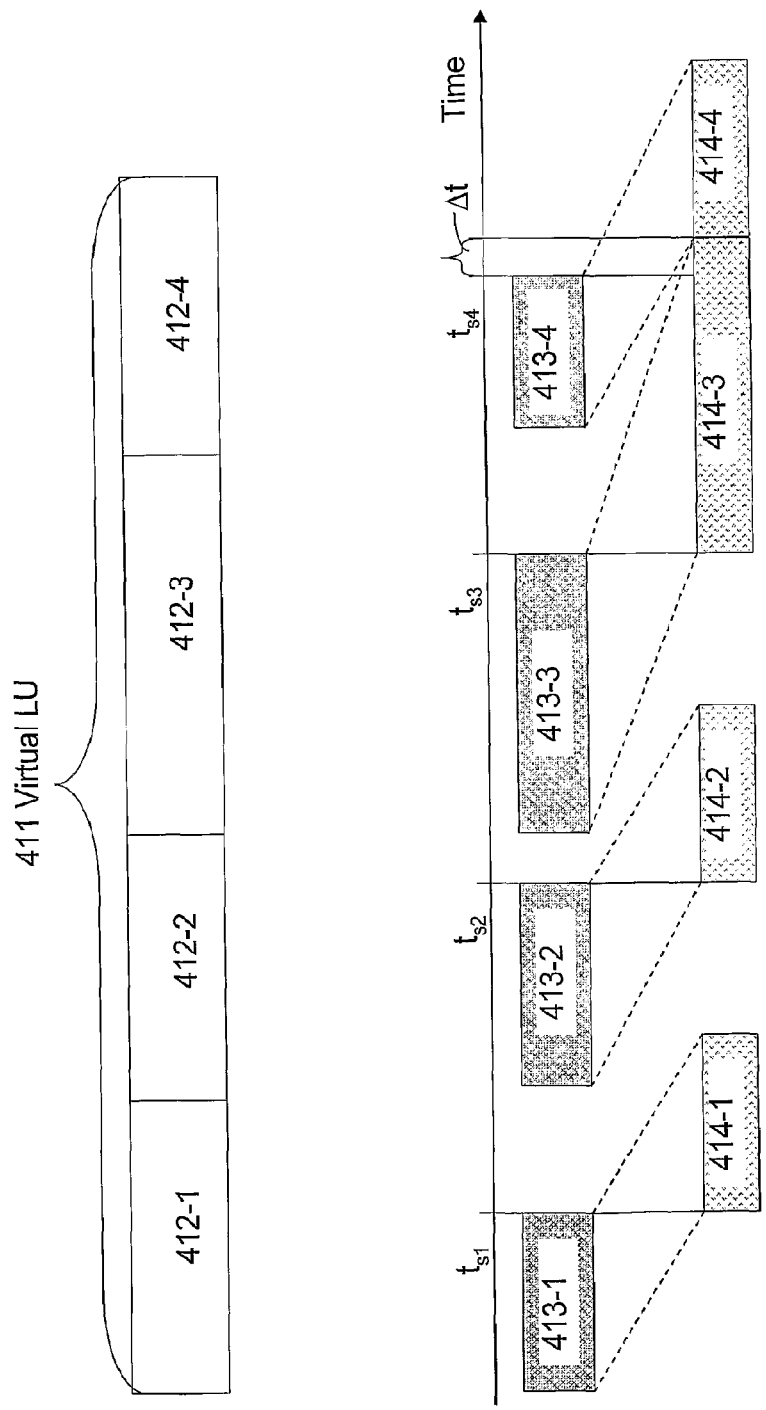
Figure 4D:
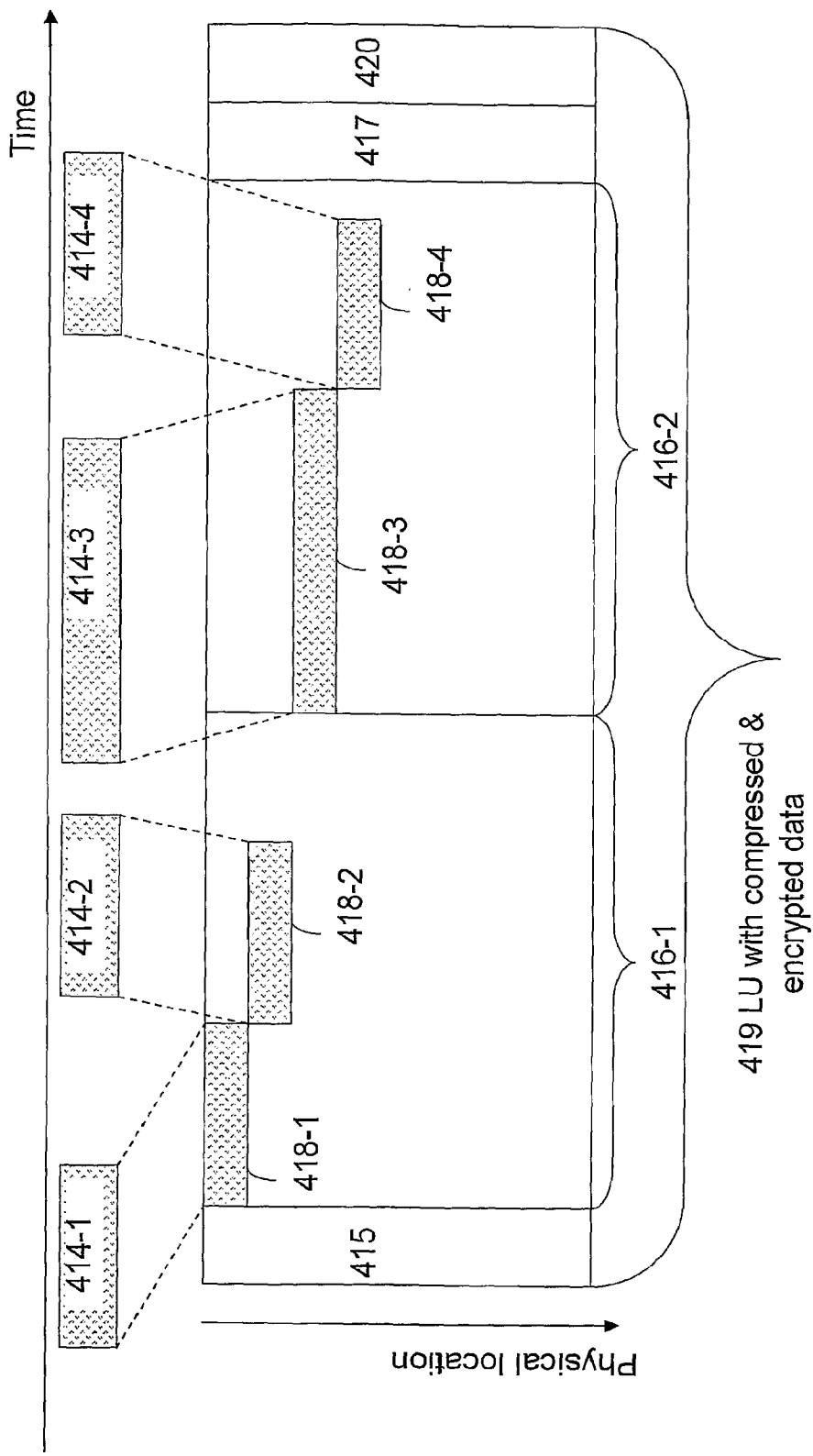

FIGS. 4c-4d illustrate schematic diagrams of original and compressed and encrypted logical data objects in accordance with certain embodiments of the present invention for block mode access. The chunks of data comprised in the original LO are sequentially transformed into data chunks (418-1-418-4 illustrated in FIG. 4d) accommodated in the received order into accommodation sections 416-1, 416-2. Said original data chunks corresponding to the transformed data chunks (418-1-418-4) are virtually represented in the VLU 411 as data chunks (412-1-412-4) illustrated in FIG. 4c.

Similar to embodiments detailed with reference to FIGS. 4a and 4b, processing the original chunks of data (412-1-412-4) into stored data chunks (418-1-418-4) comprises two synchronized parallel processes: 1) compressing the original chunks into compressed data chunks (413-1-413-4), and 2) encrypting the compressed data chunks (413-1-413-4) into encrypted chunks (414-1-414-4) to be accommodated. Accordingly, the compression and encryption processes are coordinated with respect to time and execute autonomous sets of instructions related, respectively, to compression and to encryption, while the compression and the encryption are provided in a manner preserving the sequence of the original chunks. The synchronization of the processes is characterized by that each output chunk processed in the compression process selves as an input chunk in the encryption process. Accordingly, the sequences of compressed and encrypted data chunks correspond to the sequence of the original data chunks.

As illustrated in FIG. 4d, the processed chunks (414-1-414-4) are written to the accommodation sections (stored chunks 418-1-418-4) in accordance with the order of receiving respective chunks of original data. The transformed LO (LU 419 comprising compressed and encrypted data) comprises a header 415, one or more accommodation sections 416, one or more index sections (IS) 417 and a free space 420. The header 415 comprises a unique descriptor containing a logical unit number (LUN), the size of the virtual logical unit (VLU), the size of storage logical unit (optionally), an open/recovery flag, a signature indicating whether at least part of the storing data were processed by the transformation system 16, etc.

In other embodiments of the present invention (e.g. in certain embodiments when encryption/decryption and/or compression/decompression functionalities are integrated with the storage device, etc.) the header 415 or any of its parts and combinations thereof may constitute a part of disk attributes, the index section 417 may constitute a part of the disk attributes, etc.

Thus, chunks of data comprised in the original logical data object (LO) of any type are sequentially transformed and accommodated in the received order in one or more accommodation sections, wherein the transformation comprises compressing and encrypting processes. Compressing the chunks may be provided similar to compressing transformation described with reference to FIGS. 2a-b. The initial k bytes of the data to be compressed are used as a dictionary. The same dictionary is used for compression of the first and subsequent chunks of sequential data to be compressed while the dictionary is adapted in accordance with processed data, e.g. per Lempel-Ziv algorithm. The process is continued for all chunks to be accommodated (after encryption) in a certain accommodation section (selection of a section for accommodation is further detailed with reference to FIG. 9). The initial k bytes of next chunk of original data to be accommodated in a subsequent accommodation section will be used for renewing the dictionary to be used for compressing the data to be accommodated in said subsequent accommodation section. In certain other embodiments of the invention a new compression sequence started in the new compressed section may use the same initial compression dictionary as the previous sequence.

Each compressed chunk matching certain criterion is further encrypted before storing in respective accommodation section in a manner similar to detailed with reference to FIGS. 3a-3b. A block cipher encryption algorithm breaks plaintext data in the compressed chunks into fixed-size segments. The first and subsequent compressed chunks are encrypted with the same secure key and accommodated in an appropriate accommodation section. The process is continued until the total size of the encrypted data substantially achieves the predefined size of the accommodation section. The next encrypted chunk will be accommodated in a subsequent accommodation section. The data to be accommodated in different accommodation sections may be encrypted with the same or with different secure keys. The encryption process will be further detailed with reference to FIGS. 12a-12b. In certain embodiments of the invention the transformation system enters padding data (e.g. random characters, blanks, zeros, etc.) in one or more compressed chunks to enable the input of the block cipher to be an exact multiple of the segments size. When decrypting, the transformation system removes the padding data before decompression.

Figure 5:
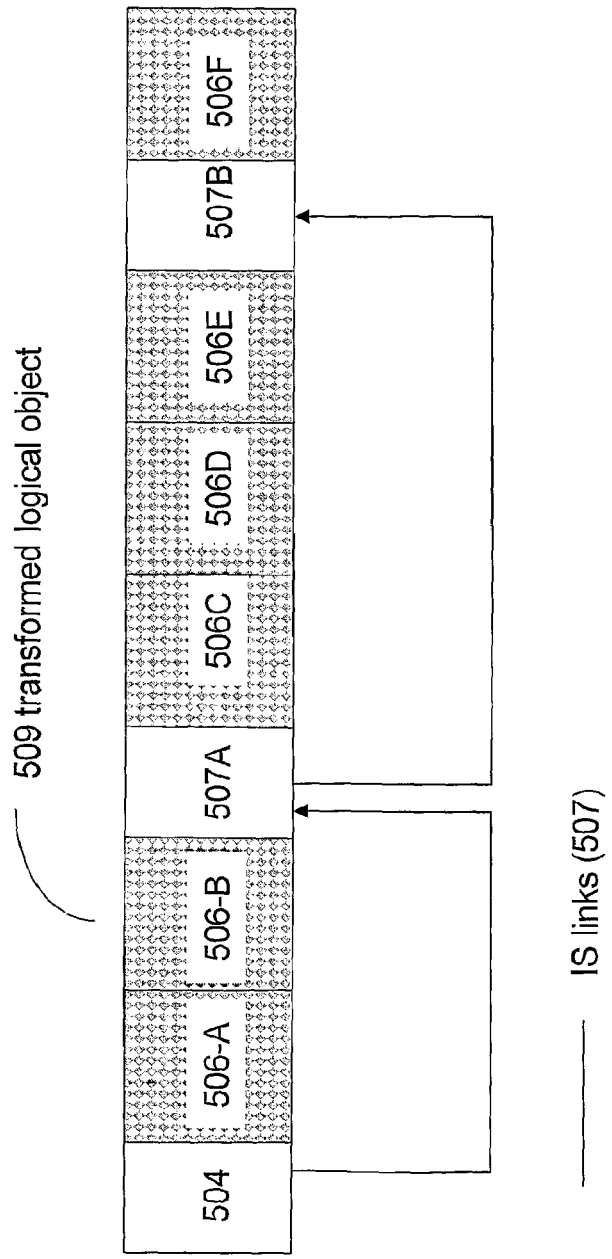
FIG. 5 is a schematic diagram of the transformed logical data object in accordance with certain embodiments of the present invention.
Figure 8:
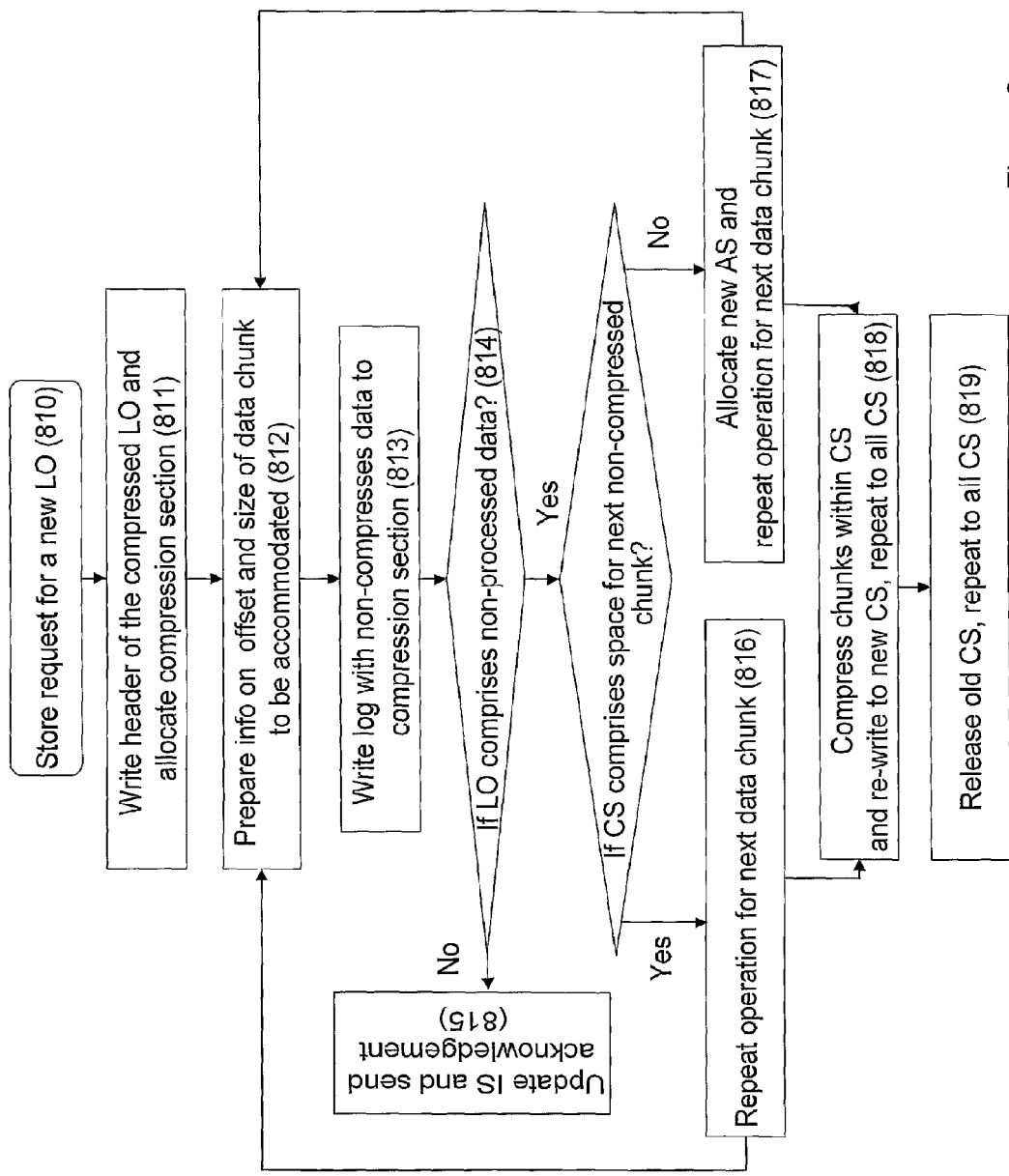
FIG. 8 is a schematic diagram of the processed logical data object accommodated in non-transformed and transformed form in accordance with certain embodiments of the present invention.

FIG. 5 illustrates a schematic diagram of the transformed logical data object in accordance with certain embodiments of the present invention. As, by way of non-limiting example, was detailed with reference to FIGS. 2a-b, 3a-b and 4a-d, chunks of data comprised in the original logical data object (LO) of any type are transformed and sequentially accommodated in the received order in one or more accommodation sections (505A-505F) with predefined size. The accommodation sections serve as atomic elements of transforming/de-transforming operations during input/output transactions (data access-related requests) on the logical data objects. The transforming processing is configured in a manner enabling substantial identity between accommodation section if being de-transformed and the original data accommodated in said section as a result of transformation.

The transformed LO 503 comprises the header 504, one or more accommodation sections (505A-505F) and one or more index sections (506A, 506B). The index section is not necessary if the transformed LO comprises one accommodation section only.

In addition to the sequentially accommodated transformed data chunks, the accommodation section has a unique identifier (typically held in a header of the accommodation section). The indication of physical storage location pertaining to the accommodation section is stored in the accommodation section itself (e.g. in the header) and/or index section. The information related to external data involved in the transformation (e.g. information related to the secure key used for encryption of the data chunks comprised in the accommodation section as, for example, key ID, pointer to key physical location, metadata related to the key, etc.) may be stored in the accommodation section itself (e.g. in the section's header) and/or index section and/or header 504.

In certain embodiments of the present invention each accommodation section has an assigned flag (e.g. a bit flag 1 or 0) indicating use/re-use condition of the section stored in the accommodation section (e.g. in the header) and/or index section. Accordingly, each transformed chunk within a section has the same flag as the section. When accommodated, at a new physical location, the accommodation section is provided with flag 0. When accommodated at a physical location previously occupied by another accommodation section, the accommodation section is provided with a flag opposite of the flag of said another accommodation section being rewritten. Accordingly, new transformed data chunks being written to a certain physical location can be differentiated from old data chunks previously accommodated at said physical location into the old (being rewritten) accommodation section as having different flags. This process is further detailed with reference to FIG. 9.

For purpose of illustration only, the following description is made with respect to transformed data chunks accommodated in a log form (referred to hereinafter as logs). It should be noted that the invention is not bound by the log form and is, likewise, applicable to any other form of sequential accommodation of the processed chunks of data.

In addition to the transformed data, each log comprises information (typically held in a log's header) in respect of an offset of the original chunk of data within the logical data object, size of said original chunk, and an identifier allowing associating the log with the accommodation section which accommodated the log (e.g. ID of the corresponding accommodation section plus flag indicating use/re-use of physical location of the section as described above, etc.). This information or parts thereof may be stored in transformed and/or non-transformed form. As will be further detailed for a case of encryption with reference to FIGS. 12a-12b, the logs may also comprise transformation-related information (e.g. initialization vector, key ID, etc.).

In certain embodiments of the invention the intercepted control transaction (e.g. "set end of file"/truncate) are written to the accommodation section as a log sequential to the respective transformed data chunks and comprising a header with zero value of a data size field.

The index section 506 comprises at least one entry associated with at least one accommodation section, this entry comprising pointer(s) (or other indicators) to physical storage location of the accommodation section and records related to the respective logs accommodated in the accommodation section (e.g. offset and size in the original/updated LO, association with the accommodation section, one or more flags assigned to the logs, etc.), said records referred to hereinafter as "log records." Optionally the entry may comprise additional information as, for example, a signature indicating if at least part of logs accommodated in the accommodation section comprise data in non-encrypted, non-compressed or otherwise non-transformed form, one or more flags assigned to the accommodation section, dictionary used for compression of the section, information related to secure key used in the section, free size for accommodation in said accommodation section, indication of encryption, compression and/or other algorithms used during transformation (if variable), etc. In certain embodiments of the invention the index sections have equal predefined size.

In certain embodiments of the invention the entry comprises only one, mostly updated log record in respect to each log. In other embodiments, e.g. as will be further detailed with reference to FIGS. 11a-11b, the entry may comprise updated and outdated records with respect to the same log.

There are several ways of creating and/or updating the index section 506. For example, the first index section may be created substantially when creating the transformed logical object and the following index section(s) (if any) may be created when there is no free space in the current (active) index section to accommodate a new entry. Alternatively, the first and/or the following index sections may be created at a certain time after storing the corresponding accommodation sections based on information thereof, but not later than closing the logical data object. The corresponding entries may be written/updated simultaneously with every update of the stored logical object, or at a certain later time (e.g. when starting a new accommodation section) based on data comprised in the accommodation sections, but not later than closing the logical data object. In a case of a failure, the index section(s) may be restored based on information comprised in the accommodation sections as will be further detailed with reference to FIG. 10.

In certain embodiments of the invention the header 504 comprises an indicator (e.g. pointer) to physical location of the first index section and each index section has an indicator to the next sequential index section. Said indicators constitute one or more links 507 connecting sequential index sections. Optionally, the header 504 may also comprise an indicator to the first accommodation section and each accommodation section may have an indicator to the next sequential accommodation section. Said indicators may constitute one or more links connecting sequential accommodation sections.

Among advantages of certain embodiments of the present invention is the ability to transform and write variable size chunks of data wherein a predefined size accommodation section is used for de-transforming and reading.

Referring to FIGS. 6a-b, there are illustrated schematic diagrams of original and transformed logical data objects during an update process.

In the example illustrated in FIG. 6a, chunks of data 601-1, 601-2 and 601-3 constituting the original LO are transformed, correspondently, into sequential logs 608-1, 608-2 and 608-3 accommodated in the accommodation section 605-1. The index section 606-1 comprises information related to said accommodation section and the logs thereof. By way of non-limiting example, the illustrated index section comprises accommodation section ID with a pointer to physical location (QWORD) and a list of respective records comprising offset (QWORD) and length (WORD) for each chunk of original data corresponding to the transformed chunks accommodated in the section. Generally, the index section also comprises an indicator (e.g. ID) of the next index section.

The exemplified information in the index section means that data transformed into log 608-1 correspond to the range AB (offset A, length L1); data transformed into log 608-2 corresponds to the range BC (offset B, length L2); and data transformed into the log 608-3 correspond to range CD (offset C, length L3).

FIG. 6b illustrates an example of a case when a new data chunk 601-4 having length L4 shall replace the data in the original LO starting from offset $C_1$, where $(C_1+L_4)=E<D$. The new chunk of data is transformed and accommodated in the accommodation section accommodating the previous transformed logs (referred to hereinafter as an active accommodation section) if said section comprises enough free space to accommodate said new log. If not, as illustrated in the example, the new accommodation section 605-2 will be opened to accommodate the new log 608-4. The previously accommodated logs are kept unchanged, while the index section 606-1 is updated in a manner facilitating one-to-one relationship between each point in the original data range and the data to be read from the logs after de-transformation. In certain embodiments the index section comprises only last updated log records; in other embodiments the index section may comprise also old log records and special marking for differentiating between old and updated records. Keeping old records in addition to updated records may be useful for certain applications, for example, for continuous data protection as further detailed with reference to FIG. 11.

In the example illustrated in FIG. 6b the index section comprises only last updated records. The updated information in the index section means that the updated range AD corresponds to the following data in the transformed logs: the range AB corresponds to data to be de-transformed from the log 608-1 in the accommodation section #1 with physical location X, the range $BC_1$ corresponds to the part of data (namely offset B, length $L2_1$) to be de-transformed from the log 608-2 in the accommodation section #1 with physical location X, the updated range $C_1E$ corresponds to the new log 608-4 in the accommodation section #2 with physical location Y, and the range ED corresponds to the part of data in log 608-3 (namely offset E, length $L3_1$) in the accommodation section #1 with physical location X. In the illustrated example, all data comprised in the logs 608-1 and 608-4 are live, while part of the data comprised in the logs 608-2 (namely range $C_1C$) and 608-3 (namely range CE) are outdated. Updating the index section is falter detailed with reference to FIG. 9.

Referring to FIG. 7, there is illustrated a generalized flowchart of creating transformed logical data object in accordance with certain embodiments of the present invention. Upon receiving request 710 to store a LO, the transformation system writes 711 the header of the transformed LO to appropriate storage location (e.g. next to the end of previous stored logical data object), and allocates $1^{st}$ accommodation section to accommodate the processed data. The initial header's record comprises the indication of transformation status (e.g. flag "ON" meaning that transformation is "in progress;" optionally, separate flags for different processes comprised in the transformation process, etc.). The transformation system also prepares 712 information (e.g. offset, size of data, etc.) related to the data chunk to be transformed.

In accordance with certain embodiments of the invention, the transformation system is configured to hold certain criteria to be matched during transformation. The criteria may be related to characteristics of the logical data object, data chunk and/or accommodation section and/or transforming operation or parts thereof. The criterion may be, for example, maximal length $L_{max}$ of data to be transformed as one log; and/or maximal time $T_{max}$ of receiving original data to be transformed as one log; certain relationships between original and transformed data chunks and/or LO (e.g. minimal estimated or actual compression ratio; pre-defined type and/or format of data and/or LO, etc.

In certain embodiments of the invention the predefined criterion may be related to transformation time of a data chunk and/or entire logical data object (e.g. maximal, estimated or actual, time of transformation (or steps thereof) of data chunk. This transformation time related criterion may be limited by operational system time out, characteristics of storage network and/or storage device, reliability requirements, etc. In some embodiments this criterion may be, for example, actual transformation time of a data chunk, while in other embodiments this criterion may include, for example, chunk size, and/or type of data and/or compression algorithm and/or other characteristics and a combination thereof allowing estimating the expected transformation time of the data chunk. Accordingly, characteristics of the chunk to be obtained for comparing with this criterion may be the characteristics allowing estimating the expected transformation time or actually measured time of transformation. For transformation comprising more than one process (e.g. compression and encryption), the transformation time criterion may be related to each process separately and/or to the entire transformation process.

The transformation system further verifies 713 if the data chunk to be transformed fits a predefined criterion. The verification comprises obtaining certain characteristics of the chunk and/or accommodation section and/or transformation operation, and comparing them with said criterion. The characteristics may be obtained, for example, by identifying certain parameters of the chunks (e.g. type of logical object, authorization marks, size, etc.), and/or by estimation of expected transformation results based upon observable characteristics (e.g. size, type of data, etc.), and/or by providing actual transformation (or parts thereof) and identifying result(s).

If the criterion is matched, the transformation system processes 714 the data chunk and facilitates its accommodation in the accommodation section as a log comprising the data in transformed form. The previously prepared log-related information (offset, size, etc.) may be written within the log in transformed and/or non-transformed form. Said information may also comprise indication (e.g. flag) of form of data comprised in the log (e.g. transformed, not transformed, partly transformed).

If the criterion is not matched (e.g., if the raw data chunk is transformed or supposed to be transformed during a period exceeding, for example, 30 milliseconds, and/or compressed to not less than X % (say 95%) of the original size, etc.), then the transformation system facilitates 715 accommodation of the data chunk in the accommodation section as a log comprising data in non-transformed form. For transformation comprising more than one process the data chunks may be accommodated in partly transformed form. For example, referring back to the example illustrated with reference to FIG. 4, the compression of the original chunk 402-4 into compressed chunk 403-4 is finished at $t_{s4}$, while the encryption of the compressed chunk 403-3 into encrypted chunk 404-3 is not complete till this moment. In certain embodiments the transformation system may be configured to support transformation time-related criterion requiring zero delay between end of compression and start of encryption of the respective data chunk (and/or limited time of overall transformation process). In this case the transformation system may stop (or do not start) the encryption of the compressed chunk 403-3, and accommodate the respective chunk 408-3 in partly transformed form. Alternatively, the transformation system may omit compressing the chunk (e.g. if there is an additional requirement to keep all data encrypted), encrypt non-compressed data comprised in the chunk 402-3 and accommodate the respective chunk 408-3 in partly transformed form.

Among advantages of processing in accordance with the transformation time related criterion is the ability to facilitate transformation of a logical data object within a predefined time window, accordingly, to facilitate, for example, on-line transformation while keeping data integrity, accessibility and availability, etc.

For fitting a certain criterion as, for example, maximal length $L_{max}$ of data to be transformed as one log and/or maximal time $T_{max}$ of receiving original data to be transformed as one log, the transformation system is configured to segment the received data range L and to process each segment as a separated chunk.

Those skilled in the art will readily appreciate that in certain embodiments of the invention the operation 713 of verifying match to certain criterion may be configured to be omitted (and/or the criterion may be setup as "any chunk"), and accordingly, all data chunks shall be transformed by the transformation system.

After processing (714 or 715) of a given data chunk is completed, the compression system prepares log-related information to be recorded in the index section.

The transformation system further checks 716 if the raw logical data object comprises non-processed data and repeats 717 the process for the next data chunk until at least one of the following is achieved: a) all data in the LO are processed; b) there is not enough free space in the active accommodation section to accommodate the next transformed data chunk. The transformation system updates 718 the index section, sends acknowledgement to the clients 11 and/or servers 12 and, if started new AS, releases the access protection to the data in the previous accommodation section if said protection was provided on a AS level. The update of the index section may be provided substantially in parallel with acknowledgement, when allocating the new AS and/or closing the LO and/or in accordance with other predefined rules.

As will be further detailed with reference to FIG. 9, if the free space in the active accommodation section is insufficient to accommodate the next data chunk (e.g. writing operation fails on target buffer overflow, estimated expected log size more than said free space, free space is less than size of data chunk to be processed or predefined part thereof, etc.), but still not all data in the LO are processed, the transformation system allocates new accommodation section and repeats 719 the operations for new data chunk(s). When all data are processed, the transformation system releases the access protection of the LO (if said protection was provided for the entire LO).

The entries in the index section will comprise indication of transformed/non-transformed/partly transformed form of data accommodated in each of accommodation sections. This indication may be provided for entire accommodation section and/or each accommodated log. The header is provided with corresponding indication of the status of the transformed LO. In certain embodiments of the invention this indication may be flag "OFF" (or other similar indication) meaning that the processing is "completed," regardless of form of data accommodated in the accommodation sections. In other embodiments of the invention the flag "OFF" may be provided only when all accommodation sections comprised in the compressed LO accommodate data in the transformed form; until this moment the flag (or other indication) in the header may be kept "ON" or have some special indication that the processing is completed, but still some data are non-transformed or partly transformed.

Certain embodiments of the invention may further comprise postponed transformation of non-transformed or partly transformed data accommodated in at least one accommodation section. Such postponed transformation may be provided in accordance with a predefined/configurable time schedule (e.g. during non-working hours), per pre-defined event (e.g.

administrator's request, absence of data access-related request to given LO during predefined/configurable period of time, available network bandwidths fitting predefined/configurable criteria, etc.).

The process described with reference to FIG. 7 may be likewise applicable for updating existing logical data objects.

In certain embodiments of the invention, the criterion may be negative, for example data chunks may be accommodated in non-transformed or partly transformed form by default, unless they match certain criterion (e.g. data type and/or application). Implementation of such embodiments is illustrated, by way of non-limiting example, in FIG. 8 for a case of compressing transformation.

Upon receiving request 810 to store a LO, the transformation system writes 811 the header of the transformed LO to appropriate storage location, and allocates $1^{st}$ accommodation section to accommodate the processed data. The initial header's record comprises the indication of transformation status (e.g. flag "ON" meaning that transformation is "in progress;" optionally, separate flags for different processes comprised in the transformation process, etc.). The transformation system also prepares 812 information (e.g. offset, size of data, etc.) related to the data chunk to be accommodated. The transformation system further writes 813 the data chunk to the accommodation section as a log comprising the data in non-compressed form. Optionally, before operation 813, the transformation system verifies if the data chunk fits a predefined criterion requiring (e.g. mandatory or in accordance with further criterion) its compression before writing. The transformation system may further provide data padding to fit the entire size of accommodated data chunks to the size of AS.

The transformation system further checks 814 if the raw logical data object comprises non-processed data, updates 815 the index section, and sends acknowledgement to the clients 11 and/or servers 12. The process is repeated 816 for the next data chunk until all data in the LO are processed and accommodated (817, 816) in one or more accommodation sections thus giving rise to the transformed logical data object stored in accordance with certain embodiments of the present invention.

The log records in the index section comprise indication of compressed/non-compressed form of data in the accommodated logs; likewise, the indication may be provided for entire accommodation section. The transformation system is scanning the accommodation section to find out one or more AS comprising non-compressed data, provides compression of the accommodated data, and sequentially accommodates 818 the compressed data in newly allocated AS(s). The old accommodation section is released 818 as was described, for example, with reference to FIG. 5.

Figure 9:
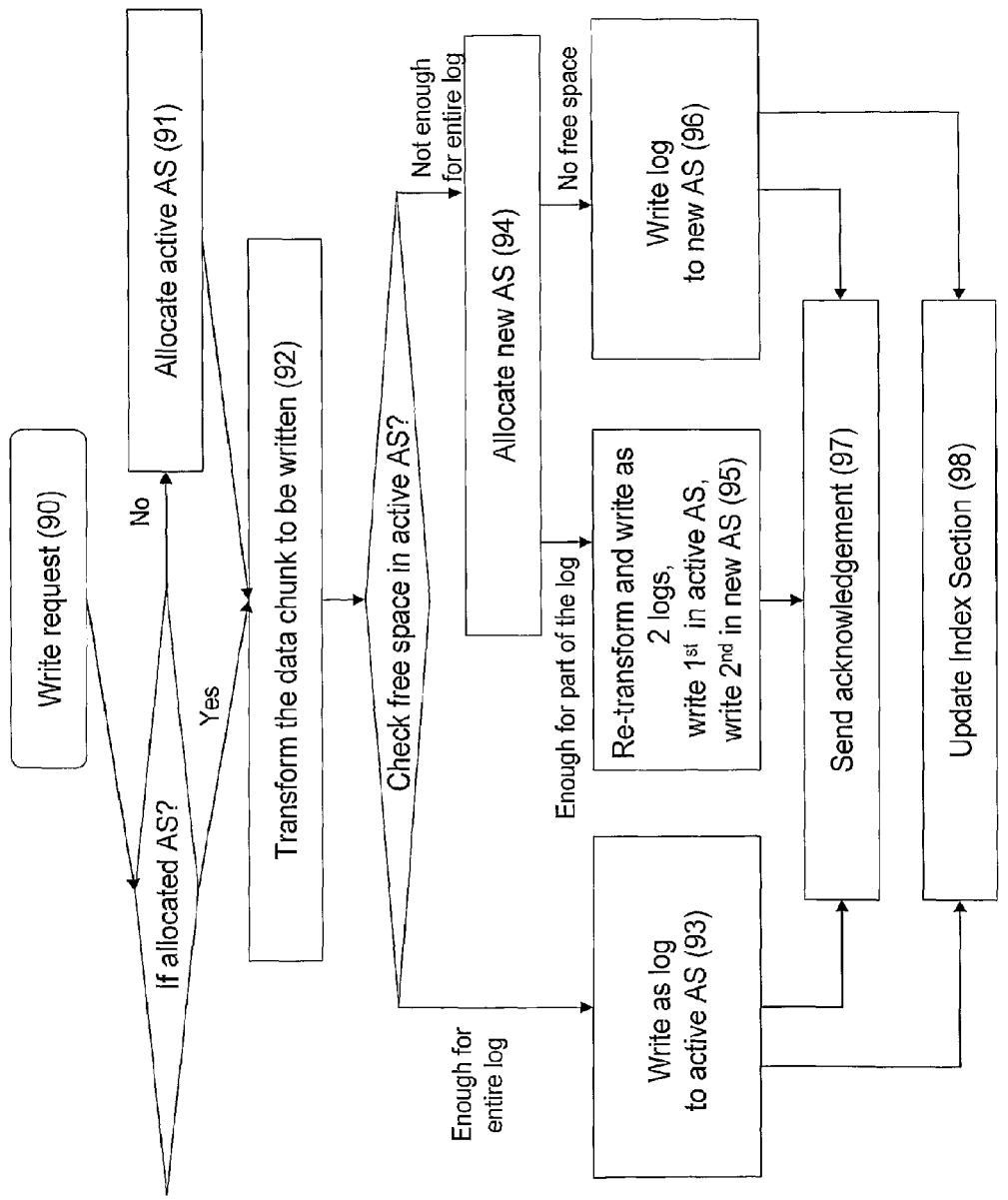
FIG. 9 is a generalized flowchart of write operation on a transformed logical data object in accordance with certain embodiments of the present invention.

Referring to FIG. 9, there is illustrated a generalized flowchart of write operation on transformed logical data object (LO) in accordance with certain embodiments of the present invention. A "write" request 90 identifies the offset in the LO and the range L of data to write. The transformation system checks if there is an allocated accommodation section, and, if not found, allocates 91 an active accommodation section (AS accommodating the last log). Further, the transformation system checks if the data range does not exceed predefined maximal length $L_{max}$ of original data to be transformed as one log and creates a record comprising the offset, length and data to be transformed; assigns to this record a flag corresponding to the flag of allocated AS; and transforms 92 (e.g. compresses, encrypts, compresses & encrypts, etc.) said record. When applicable for certain transformation, the compression is provided with the same dictionary and/or the encryption is provided with the same key for encryption as the previous chunk of data.

The resulting log is written 93 to the active accommodation section if the last comprises enough free space to accommodate the log. The respective information (if any) related to the secure key (or other external data involved in the transformation) is stored in the logs and/or in the accommodation section (e.g. section header) and/or in the index section in non-encrypted form.

If the free space is insufficient (e.g. writing operation fails on target buffer overflow, estimated expected log size more than said free space, etc.) the transformation system allocates 94 a new accommodation section. Allocation of the new AS includes assigning the physical location and assigning the flag as described with reference to FIG. 5. In certain embodiments of the invention allocating of new AS may include also writing a pointer to said section in the currently active AS.

If the free space in the active AS is insufficient to accommodate the entire log, but meets a predefined criterion (e.g. more than predefined size, more than predefined ratio of entire required space, etc.), the transformation system splits 95 the original chunk into two parts and processes them into two logs, writing one in the active AS and the second in the new AS. In certain embodiments of the invention, the transformation system de-transforms (e.g. decrypts and/or decompresses the active AS) or otherwise calculates or estimates the entire size of original data accommodated in the active AS, and estimates the size of original data to be added so that the transformed size of entire data substantially matches the predefined size of AS, thus enabling the split with maximal filling of the active AS.

If the free space in the active AS does not meet said criteria, the entire log will be written 96 in the new accommodation section. In certain embodiments of the invention writing the first log to a new AS may be followed by marking the previously active AS as full and/or virtually "correcting" the length of the last log (e.g. by padding data) as if the entire size of the accommodated logs is equal to the predefined size of AS. When closing the LO, the accommodation section active to that moment (i.e. with the last accommodated chunks) may be reduced to its real size.

After the log is written at the storage location, the transformation system sends acknowledgement 97 to the clients 11 and/or servers 12. The update 98 of the index section may be provided substantially in parallel with acknowledgement, when allocating the new AS and/or closing the LO and/or in accordance with other predefined rules.

If the data range L to be written exceeds the predefined maximal length $L_{max}$ of original data to be transformed as one log, the transformation system segments the original data in accordance with $L_{max}$ and repeats the process for each segmented chunk of data until all the data to be written are processed and accommodated into the accommodation section(s). Likewise, if the time of receiving the data range to be written exceeds the predefined maximal time $T_{max}$ of receiving original data to be transformed as one log, the transformation system segments the data range L in accordance with $T_{max}$ and repeats the process for each segmented chunk.

The index section update includes adding a log record related to a new log and updating, accordingly, previous log records related to live and/or outdated data comprised in the corresponding range. Said new log record comprises information related to the offset ($Pos_L$) and size ($Size_L$) of the original chunk transformed into said log, as well as identification and, optionally, flag of the corresponding accommodation section. The update of appropriate log records may be provided in accordance with the following procedure:

1) look over all log records (Pos, Size) in the index section(s) for log record comprising position (Pos) such that $Pos \leq Pos_L < Pos+Size_L$:

a. if found, update such log record to (Pos, $Pos_L$-Pos), and go to 2);

b. if not found—end update.

2) compare $Size_L$ with Size-$Pos_L$-Pos:

a. if more, find all log records ($Pos_1$, $Size_1$) such that $Pos_L \leq Pos_1 < Pos_L+Size_L$. Among said log records find log record with maximal position, update it to ($Pos_L+Size_L$, $Size_1-(Size_L-Pos_1)$), delete other log records among said log records and end update;

b. if less, add log record ($Pos_L+Size_L$, Size-($Pos_L+Size_L$-Pos)) and end update;

c. if equal, end update.

Those skilled in the art will readily appreciate that the invention is, likewise, applicable to any other procedure of index section update facilitating one-to-one relationship between data in the original range and data to be de-transformed from the logs. For example, the update may be provided in accordance with the following recursive procedure:

1) prepare new log record comprising position ($Pos_L$) and size ($Size_L$).

2) look over all log records (Pos, Size) in the index section(s) for log record comprising position (Pos) such that $Pos \leq Pos_L < Pos+Size_L$:

a. if found, update such log record to (Pos, $Pos_L$-Pos), and go to 3);

b. if not found, add log record ($Pos_L$, $Size_L$) to the index table and end update.

3) compare $Size_L$ with Size-$Pos_L$-Pos:

a. if more, add log record ($Pos_L$, Size-$Pos_L$-Pos). Change $Pos_L$ to new $Pos_L^1$=Pos+Size and change $Size_L$ to $Size_L^1=Size_L-(Pos_L^1-Pos_L)$ and return to 2).

b. if less, add log records ($Pos_L$, $Size_L$) and ($Pos_L+Size_L$, Size-($Pos_L+Size_L$-Pos)) and end update;

c. if equal, add log record ($Pos_L$, $Size_L$) and end update.

It should be noted that among advantages of certain embodiments of the present invention is the ability of writing the new data without decrypting and/or decompressing or otherwise de-transforming already written data and/or otherwise rewriting the written data. Only new data are transformed and accommodated, while the index section is updated accordingly and is configured to assist in reading the transformed logical data object.

Figure 10:
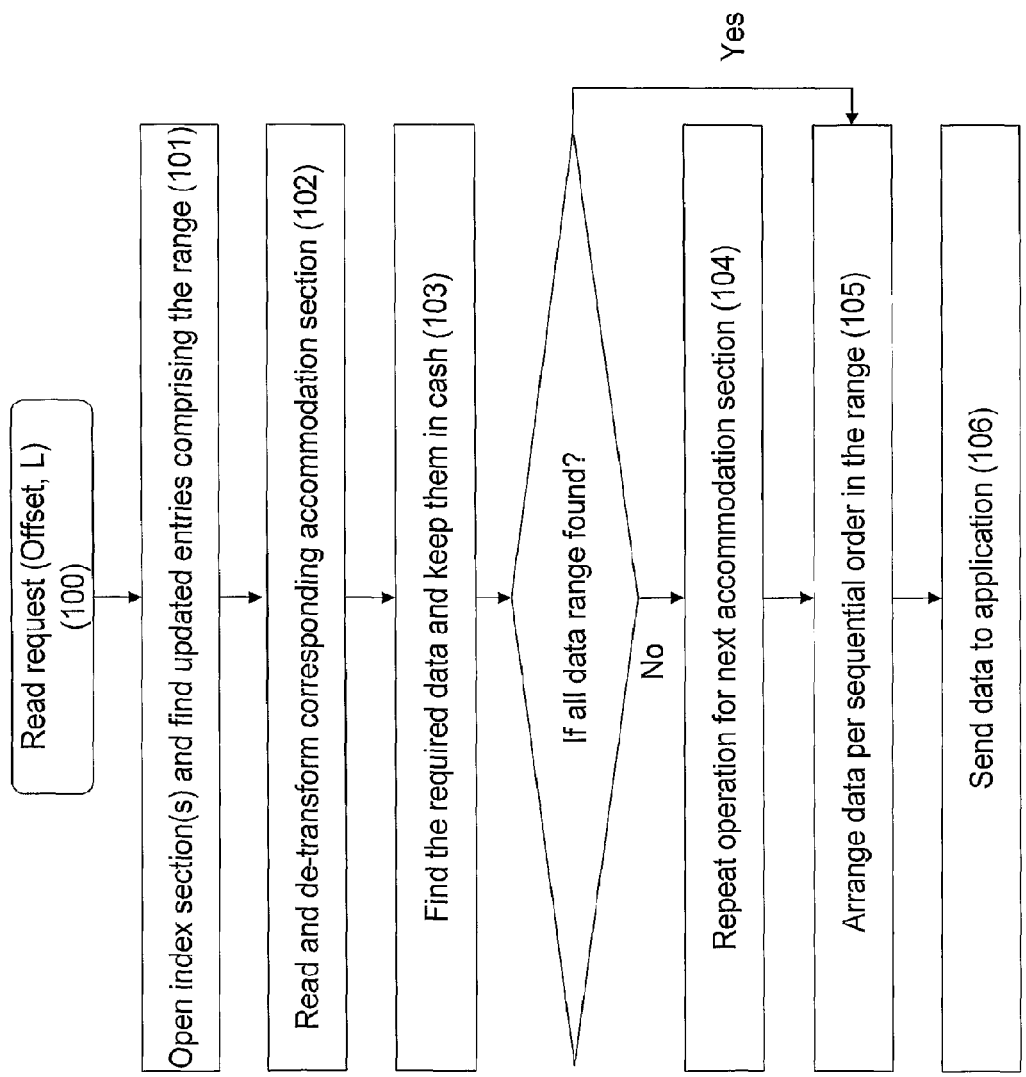
FIG. 10 is a generalized flowchart of read operation on a transformed logical data object in accordance with certain embodiments of the present invention.

Referring to FIG. 10, there is illustrated a generalized flowchart of read operation on transformed logical data object (LO) in accordance with certain embodiments of the present invention.

The read operation starts with read request 100 identifying the offset of data in the LO and the range of data to read. The transformation system 16 addresses all index sections (e.g. sequentially starting from the last section or from the currently open; or opening all together, etc.) to find out 101 all last updated entries related to the data within the range. As was detailed with reference to FIG. 5, the last-updated entries in the index section facilitate one-to-one relationship between the data in the range and the live (mostly updated) data to be extracted from the transformed data chunks (logs). Accordingly, the transformation system sequentially de-transforms 102 (e.g. decrypts, decompresses, etc.) one of the accommodation sections corresponding to found entries, finds the required data 83. In certain embodiments of the invention the operation 102 starts with accommodation section comprising data from the very end of the range to be read. The operations 102-103 are repeated 104 to the next accommodation section(s) until all data from the range have been found. The found data are arranged 105 in accordance with their order in the range. After the data are ready, they may be sent 106 to an application.

In certain embodiments of the invention the stored transformed logical object may be optimized. The optimization may be provided by scanning the accommodation sections (e.g. by analyzing entries in the index section(s)) to find out one or more AS comprising more than predefined percent (e.g. 90%) of outdated data. Such AS are de-transformed, the live data are extracted and transformed and stored in the active accommodation section as a new log(s) and the old accommodation section is released. The transformation system keeps the list of released accommodation sections and uses the corresponding physical location when allocating a new accommodation section. As was described with reference to FIG. 5, the new allocated AS and logs thereof will have the flag opposite to the flag of the old accommodation section. Said optimization may be provided when closing the logical object, per predefined schedule, pre-defined event(s), etc.

Among advantages of certain embodiments of the present invention is the capability to recover (and/or create) an index section in accordance with information comprised in the accommodation section. For example, if the recovery flag of the opening logical data object is "ON," the transformation system initiates a recovery process. The recovery process starts with checking if the transformed logical object comprises one or more non-indexed accommodation sections (i.e. the accommodation sections do not comprise at least one log having a corresponding log record in at least one index section).

During recovery, the logs in such non-indexed AS are sequentially de-transformed in reverse order starting from the last log until (if) a log with an opposite flag is found (i.e. a log that belongs to the old and released AS, and comprises outdated data). The transformation system generates entries corresponding to the de-transformed logs, saves them in the memory and/or writes to the index section. The logs are transformed back (and/or are temporary kept de-transformed, e.g. decrypted, decompressed, etc., if the recovered accommodation section comprises data to be read) and the recovery flag is switched to "OFF."

A failure may also occur when, for example, a new log has been provided with the corresponding log record in the index section, but other appropriate entries have not been updated yet. When reading such a transformed logical object, the transformation system may find inconsistency between data (more than one entry for the same point in the range) and correct the index section in accordance with the mostly updated entries (corresponding to latest logs related to the same range).

Figure 11A:
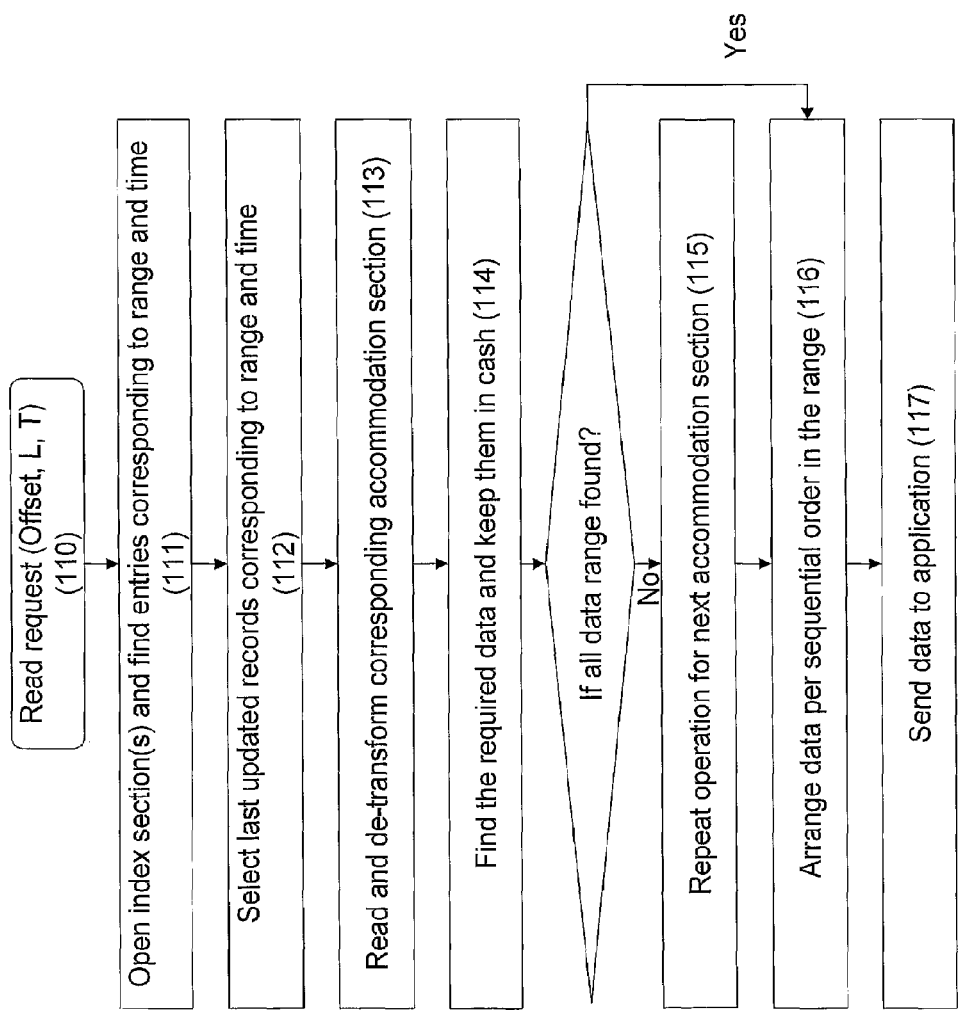
FIG. 11a is a generalized flowchart of read operation with specified point in time in accordance with certain embodiments of the present invention.

Referring to FIG. 11a, there is illustrated a generalized flowchart of read operation in response to data request with specified point in time to be read. As was detailed with reference to FIGS. 2-9, the new data chunks are transformed and written for storage without de-transforming and/or otherwise rewriting already written data, while the index section is updated accordingly. Each entry of the index section comprises pointer(s) (or other indicators) to physical storage location of the accommodation section and one or more log records. Also it was detailed that, simultaneously with the last-updated records, the entry may comprise previously-updated (and/or original) records related to the same logs and special marking for differentiating between old and updated records. In accordance with certain embodiments of the present invention each log record comprises or is otherwise associated with time stamps indicating the time of updating said log record and respective offset and length of data to be read in accordance with said log record, wherein the entry comprises one or more log records with respect to the same log and bearing different time stamps. Among advantages of such technique is a capability of keeping every change made to data and time thereof, which allows a user or an administrator to access historical data by specifying the desired point in time or time range.

The read operation starts with read request 110 indicating the desired point in time to be accessed and identifying the respective offset and length of data to be read. The transformation system 16 addresses all index sections (e.g. sequentially starting from the last section or from the currently open; or opening all together, etc.) to find out 111 corresponding entries, i.e. entries related to the data within the range and comprising log records with time stamps prior or equal to the desired time T. The transformation system further selects 112 the last updated entries/log records among said corresponding entries/log records, sequentially de-transforms 113 (e.g. decrypts, decompresses, etc.) one of the accommodation sections corresponding to the selected entries, finds the required data 114 and keeps them in cache. The operations 113-114 are repeated 115 to the next accommodation section(s) until all data from the range and corresponding to desired point in time have been found. The found data are arranged 116 in accordance with their order in the range. After the data are ready, they may be sent 117 to an application.

Likewise, the read operation may be provided for several desired points in time simultaneously. It should be noted that although the described embodiments allow reading different versions of the original data, there is still kept a one-to-one relationship between each point in the original data range and the data to be read from the logs after de-transformation.

The transformation system may further provide optimization of the stored transformed logical object in a manner similar to detailed with reference to FIG. 10. The optimization may be provided by analyzing entries in the index section (s)) to find out one or more outdated AS, i.e. AS comprising more than predefined percent (e.g. 90%) of data associated with time stamps meeting certain criterion, such data are considered outdated. The criterion may be related to time (e.g. time stamps prior to predefined and/or pre-configurable time), and/or number of time stamps related to the same point in the original data (i.e. not more than three time stamps and, accordingly, backward saved changes), and/or certain events (e.g. providing full backup of the stored data), etc. Such outdated AS is de-transformed, the live data are extracted and transformed and stored in the active accommodation section as a new log(s) keeping originally associated time stamps, and the old accommodation section is released. Said optimization may be provided when closing the logical object, per pre-defined schedule, pre-defined event(s), etc.

Referring to FIG. 11*b*, there is illustrated a schematic diagram of index section illustrated with reference to FIG. 6*b* and comprising time stamps in accordance with certain embodiments of the present invention.

As was illustrated with reference to FIGS. 6*a*-*b*, chunks of data 601-1, 601-2 and 601-3 constituting the original LO were transformed into sequential logs 608-1, 608-2 and 608-3 accommodated in the accommodation section #1. New data chunk 601-4 having length L4 has further replaced the data in the original LO starting from offset $C_1$, where $(C_1+L4)=E<D$. The index section 118 illustrated in FIG. 11*b* comprises log records with time stamps, the log records informing the range AB (offset A, length L1) was transformed into log 608-1 accommodated at 11:00, the range BC (offset B, length L2) was transformed into log 608-2 accommodated at 11:01; the range CD (offset C, length L3) was transformed into the log 608-3 accommodated at 11:16. Accommodation at 12:03 of log 608-4 corresponding to the updated range $C_1E$ (offset $C_1$, length L4) was followed by update of relevant log records. Accordingly, log records of the log 608-2 and 608-3 were updated at 12:03. The updated log records mean that the log 608-2 comprises live data corresponding to offset B, length $L2_1$, and the log 608-3 comprises live data corresponding to offset E, length $L3_1$. If the read request comprises, for example, desired time 12:30, the transformation system will find all log records with time stamp less than 12:30 and will select the last-updated (608-1-1, 608-2-2, 608-3-2, 608-42) records indicating what data are relevant to the desired point in time. If the read request comprises, for example, desired time 11:10, the transformation system will find all log records with time stamp less than 11:100 and will select the last-updated (608-1-1, 608-2-1) accordingly.

Referring to FIG. 12*a*, there is a schematic diagram illustrating a non-limiting example of encrypting a plaintext chunk (e.g. original chunk, compressed chunk, otherwise transformed chunk) in accordance with certain embodiments of the present invention.

In the illustrated embodiment the transformation system is capable to break a plaintext chunk into segments with fixed-size A (when necessary, the segments are rounded to said fixed size) and to encrypt each plaintext segment of the chunk into encrypted segment with fixed-size B, rounding the encrypted segments, when necessary, to said fixed size B. In the illustrated embodiments A=B=16 byte. When rounding, the transformation system enters padding data (e.g. random characters, blanks, zeros, and nulls) to satisfy the data segment size requirements. In such embodiments the size of accommodation section may be defined as a multiple of the fixed size B.

As was detailed with reference to FIGS. 3-6, the logs accommodated in the same accommodation section are encrypted with the same secure key. The security may be further increased by introducing additional cryptographic variance for different logs, e.g. initialization vector (IV). The initialization vector is a non-secret continuously changing number used as an initializing input algorithm for the encryption of a plaintext block sequence. Accordingly, in certain embodiments of the present invention, the transformation system is configured to obtain (e.g. generate as a random number) initialization vectors to be used together with secure key for encryption of the compressed chunks into encrypted logs. The IVs are accommodated in headers of respective logs.

By way of non-limiting example, the transformation system may implement known in the art Advanced Encryption Standard (AES) by US National Institute of Standards and Technology (NIST). The AES algorithm is capable of using cryptographic keys of 128, 192, and 256 bits to encrypt and decrypt data in blocks of 128 bits. As known in the art, certain modes of AES algorithm enable to use the initialization vector (IV) linearly added to (XORed with) the first chunk of plaintext or included in front of the plaintext prior to encryption with the secure key. Accordingly, the transformation system may be configured to generate (e.g. randomly) initialization vectors for the first log in each accommodation section, and further generate the IVs for sequential logs by applying XOR operation.

As the accommodation section serves as an atomic element of encryption/decryption operations, the initial IV and secure key related information may be held, in certain embodiments, in an accommodation section header with no need for accommodation in the logs headers.

As illustrated by way of non-limiting example in FIG. 12a, plaintext chunks (e.g. original chunks, compressed chunks, otherwise transformed chunks, etc.) 1201-1 (size 33 bytes), 1201-2 (size 50 bytes) and 1201-3 (size 17 bytes) are encrypted with the same key into respective sequential logs 1207-1 (size 48 bytes, including 15 bytes of padding data+header), 1207-2 (size 64 bytes, including 14 bytes of padding data+header) and 1207-3 (size 32 bytes, including 15 bytes of padding data+header) accommodated in the accommodation section 1205-1. As illustrated, the sizes of the encrypted data in the logs are rounded as multiples of 16. Each log comprises information (e.g. in a log header) about actual size of original data encrypted in respective log and, optionally, respective initialization vector and size of chunk before encryption (if differs from the original chunk). The information related to the secure key and initial initialization vector may be stored in the accommodation section (e.g. AS header) and/or index section and/or header 1204 of the transformed logical data object.

Figure 12B:
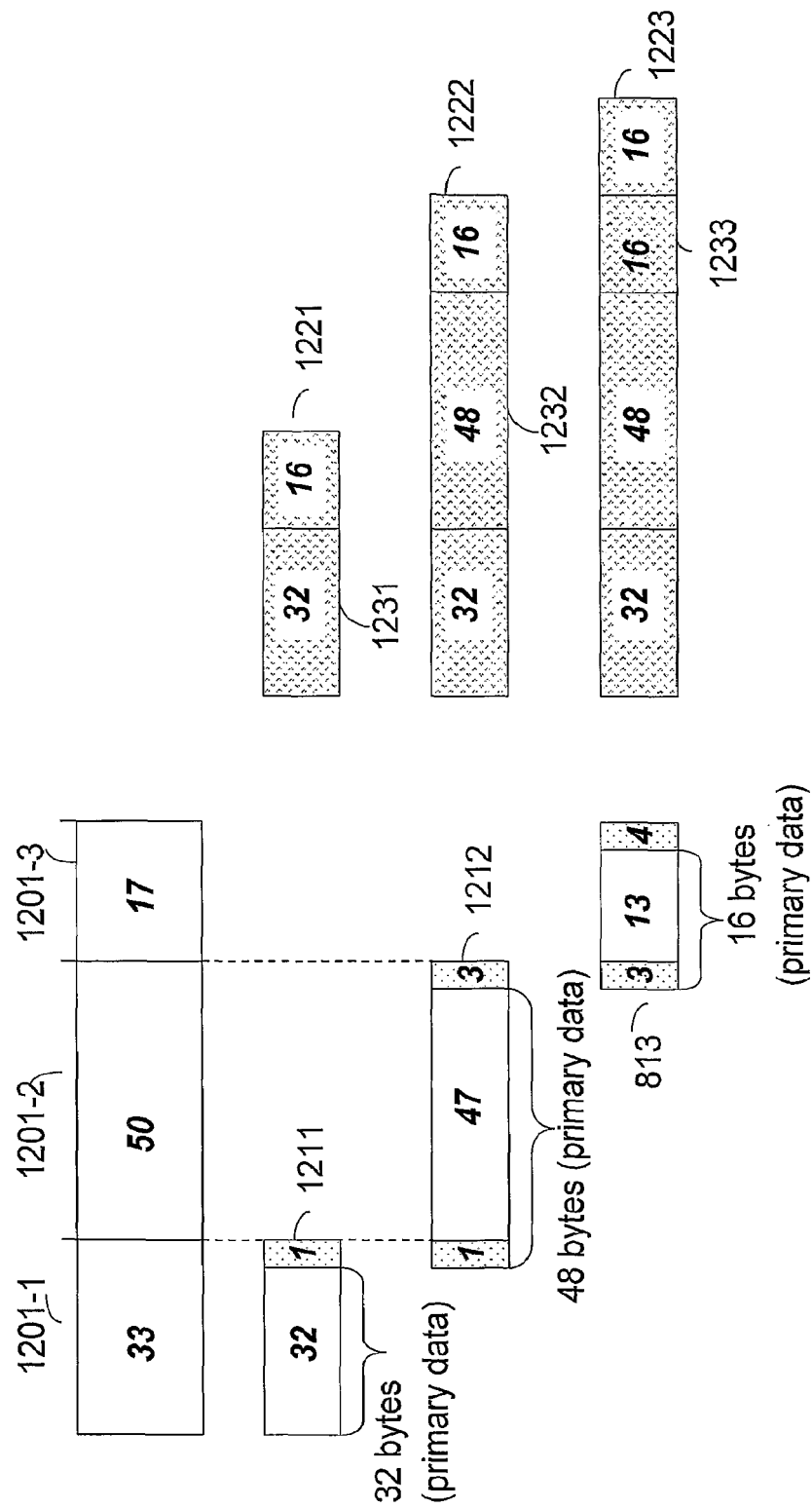

In accordance with certain embodiments of the present invention illustrated in FIG. 12b, plaintext chunks 1201-1 (size 33 bytes), 1201-2 (size 50 bytes) and 1201-3 (size 17 bytes) are encrypted by the same encryption engine as in FIG. 12a, but in a manner enabling to substantially eliminate padding data in the encrypted logs. A first plaintext chunk is divided in two parts, the first part being referred to hereinafter as "primary data," comprises sequential data starting from the offset and satisfies the data segment size requirements (e.g. multiples of 16 bytes), and the second part comprises the rest of the data less than said data segment size and is referred to hereinafter as "tail data" (in the examples illustrated there are less than 16 bytes). The first part is encrypted and accommodated in the accommodation section in a manner described with reference to FIGS. 3-6; the respective log is referred to hereinafter as "primary log." The second part with tail data is processed as a separate sequential chunk and is accommodated in the accommodation section in encrypted (or, alternatively, non-encrypted) form as a log (referred to hereinafter as "tail log"). The logs 1221 in the accommodation section correspond to the divided chunk 1211, wherein the numbers in bold italics illustrate the respective data sizes.

When processing a next chunk, the encryption system obtains the plaintext tail data from the tail log, adds said tail data at the beginning of said next chunk, divides the generated combination in primary data and tail data in a manner above; then encrypts the primary data in the primary log and the tail data in the tail log using the same secure key. The new primary log shall be accommodated at a position after the previous primary log. Total actual size of plaintext data accommodated in the logs is updated respectively (to 83 bytes in the current example). Total actual size of respective plaintext data is held and maintained in the header of the accommodation section and/or encrypted logical data object. As the size of encrypted data in the primary logs is equal to the size of plaintext primary data, it is not necessary to keep in the logs information about actual size of respective plaintext data. The information related to the secure key and initial initialization vector may be stored in the encrypted section (e.g. AS header) and/or index section and/or header 1204 of the encrypted logical data object.

The process is repeated for each next chunk until there is enough accommodating place in the accommodation section, e.g. the logs 1222 in the accommodation section correspond to the chunk 1211 and the divided chunk 1212 while the primary log 1232 is positioned as continuation of previous primary log 1231; the logs 1223 in the accommodation section correspond to the chunk 1211, the chunk 1212 and the divided chunk 1213, while the primary log 1233 is positioned as continuation of previous primary log 1232. Thus, the accommodation section comprises a sequence of primary logs followed by one (or zero) tail log.

It should be noted that the method of processing a plaintext chunk to be stored as encrypted logs is applicable in a similar manner to any method and system for encryption of logical data objects for storage comprising sequential accommodation of encrypted chunks.

Figure 13:
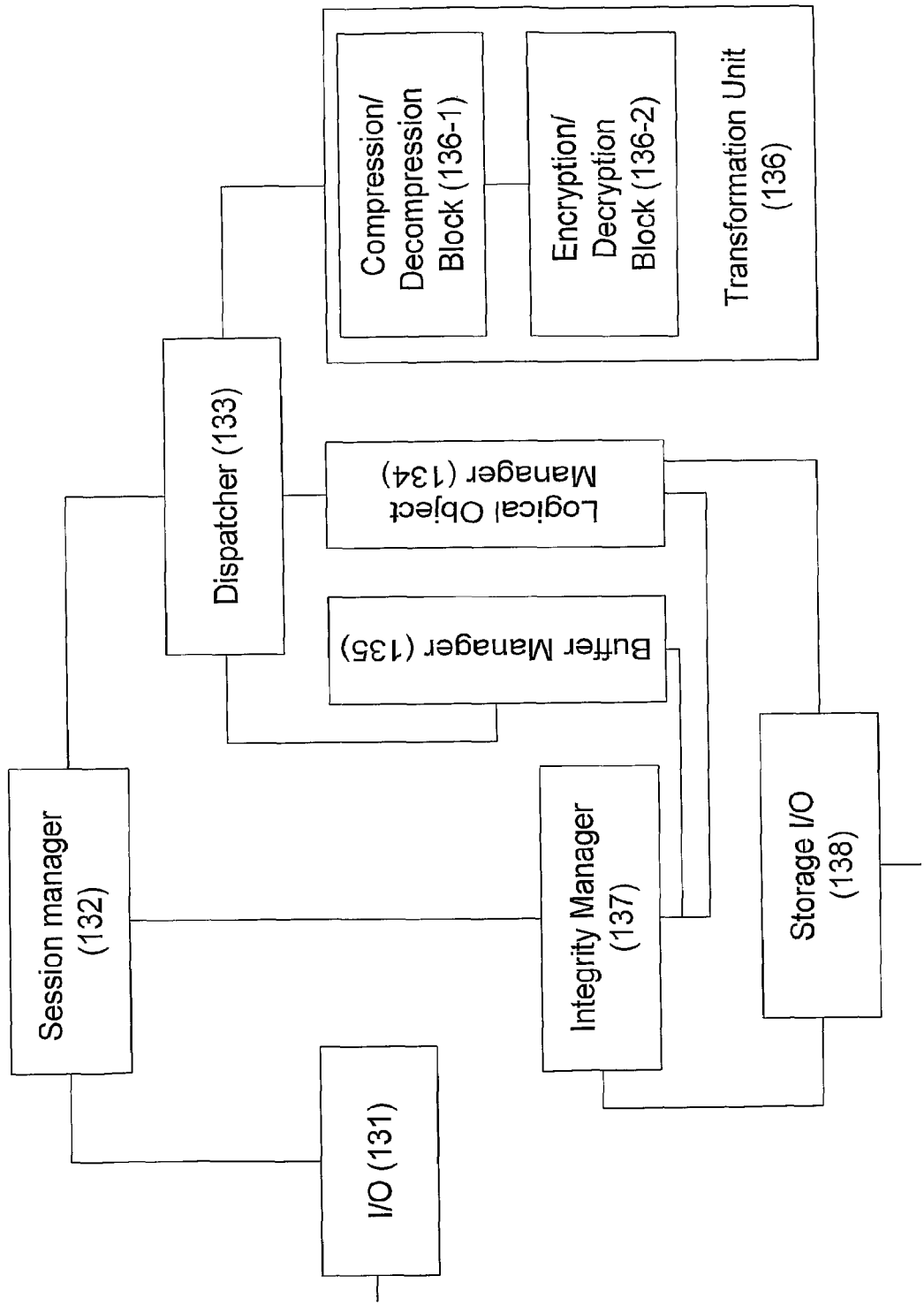
FIG. 13 is a schematic functional block diagram of the transformation system in accordance with certain embodiments of the present invention.

FIG. 13 illustrates a schematic functional block diagram of the transformation system 16 in accordance with certain embodiments of the present invention. The transformation system comprises a Client Input/Output (I/O) block 131 coupled to a session manager 132. The I/O block gets data access-related requests (e.g. read, write, set end of file/truncate, etc.) and forwards them to the session manager.

A session starts by access request to a logical data object (e.g. LUN capacity request as, for example, SCSI LUN capacity request command; open file request, etc.) and ends by disconnect request (e.g. "LUN disconnect," "close file," etc.) received from the same IP address (user). The session manager 132 holds all the session's private data as, for example, source session address, session counters, session status, all instances for the buffers in use, etc. The session manager also handles blocking all the relevant resources when the logical data object is open and releasing said resources on disconnect. The session manager transfers all requests to a dispatcher 133 operatively coupled to the session manager. The dispatcher 133 is operatively coupled to a logical data object manager 134, a buffer manager 135 and a transformation unit 136. The dispatcher 133 communicates with the logical data object manager 134 for data related transactions (e.g. Read, Write, set end of file, etc.) and the transformation unit 136 for transforming operations in accordance with certain embodiments of the present invention.

The transformation unit is capable of compressing, encrypting and/or otherwise transforming data, and sending them to a physical disk through a storage I/O 138; as well as of reading data from the physical disk through the storage I/O, De-transforming (e.g. decrypting and/or decompressing) the respective buffer and, optionally, of segmenting and/or combining original and/or partly transformed data chunks for further processing. The transformation unit may comprise one or more transformation blocks responsible for certain transforming operations (e.g. compression-decompression block 136-1 operatively coupled with the encryption/decryption block 136-2), and is configured to facilitate data transfer and necessary synchronization between said blocks. The transformation unit is also configured to report size of original logical data object (and free storage capacity) in reply to "Capacity status."

The transformation unit 136 is also configured to communicate with one or more external platforms storing external information related to data involved in the transformation process (e.g. the secure keys for receiving the keys and/or metadata thereof); to receive said the information, extract or generate the necessary data (e.g. key ID) and to manage thereof. The received information may be temporary accommodated in a trusted memory within the transformation system, wherein the transformation unit block may provide a management of said information (e.g. to manage accommodation of certain keys in said memory for certain time period in accordance with a certain policy). In certain embodiments of the invention the encryption/decryption block 136-2 may further generate one or more encryption initialization vectors to be used for encryption (e.g. together with secure keys).

The logical data object manager 134 is responsible for the ordering and memory sharing by different logical data objects and parts thereof.

The buffer manager 135 manages memory buffer resources and is responsible for allocating and releasing memory buffer for operations of other blocks. The transformation system further comprises an integrity manager 137 coupled to the session manager, the buffer manager and the data block manager. The integrity manager is responsible for synchronization and general control of all processes in the transformation system as, for example keeping the integrity of the logical data objects, etc. It is also responsible for flashing the memory buffer to the physical disk(s) through the storage physical I/O interface 138, and reading when needed from the disk(s).

Those skilled in the art will readily appreciate that the invention is not bound by the configuration of FIG. 13; equivalent and/or modified functionality may be consolidated or divided in another manner and may be implemented in software, firmware, hardware, or any combination thereof.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method for optimization of an encrypted logical data object including a plurality of storage sections storing encrypted data, said method comprising:
   receiving, by a processor, a request to store data in the encrypted logical data object;
   determining an amount of outdated encrypted data in each of the plurality of storage sections;
   identifying a storage section including an amount of outdated data that is greater than a threshold amount of outdated encrypted data;
   decrypting the outdated encrypted data in the identified storage section to generate outdated data; and
   releasing the outdated data to free storage space in the identified storage section.

2. The method of claim 1, further comprising:
   receiving the data for storage in the encrypted logical data object;
   encrypting the data to generate encrypted data; and
   storing the encrypted data in a space in the storage section vacated by the released outdated data.

3. The method of claim 2, further comprising sequentially storing the encrypted data in the storage section in an order the data was received.

4. The method of claim 1, wherein decrypting the outdated encrypted data comprises decrypting the outdated encrypted data in an order the outdated encrypted data was originally received for storage.

5. The method of claim 4, wherein releasing the outdated data comprises releasing the outdated data in the order the outdated data was decrypted.

6. The method of claim 1, wherein decrypting the outdated encrypted data comprises decrypting the outdated encrypted data in an order the outdated encrypted data was encrypted and stored in the storage section.

7. The method of claim 6, wherein releasing the outdated data comprises releasing the outdated data in the order the outdated data was encrypted and stored in the storage section.

8. A system for optimization of an encrypted logical data object including a plurality of storage sections storing encrypted data, said method comprising:
   a processor; and
   a storage device coupled to said processor, wherein the storage device is configured to store computer code that, when executed by the processor, causes the processor to:
      receive a request to store data in the encrypted logical data object,
      determine an amount of outdated encrypted data in each of the plurality of storage sections,
      identify a storage section including an amount of outdated data that is greater than a threshold amount of outdated encrypted data,
      decrypt the outdated encrypted data in the identified storage section to generate outdated data, and
      release the outdated data to free storage space in the identified storage section.

9. The system of claim 8, wherein the processor is further configured to:
   receive the data for storage in the encrypted logical data object;
   encrypt the data to generate encrypted data, and
   store the encrypted data in a space in the storage section vacated by the released outdated data.

10. The system of claim 9, wherein the processor is further configured to sequentially store the encrypted data in the storage section in an order the data was received.

11. The system of claim 9, wherein, when decrypting the outdated encrypted data, the processor is configured to decrypt the outdated encrypted data in an order the outdated encrypted data was originally received for storage.

12. The system of claim 11, wherein, when releasing the outdated data, the processor is configured to release the outdated data in the order the outdated data was decrypted.

13. The system of claim 8, wherein, when decrypting the outdated encrypted data, the processor is configured to decrypt the outdated encrypted data in an order the outdated encrypted data was encrypted and stored in the storage section.

14. The system of claim 13, wherein, when releasing the outdated data, the processor is configured to release the outdated data in the order the outdated data was encrypted and stored in the storage section.

15. A computer program product comprising a computer-readable memory including a computer readable program code embodied therein for optimization of an encrypted logical data object including a plurality of storage sections storing encrypted data, said computer program product comprising:

computer code for receiving, by a processor, a request to store data in the encrypted logical data object;

computer code for determining an amount of outdated encrypted data in each of the plurality of storage sections;

computer code for identifying a storage section including an amount of outdated data that is greater than a threshold amount of outdated encrypted data;

computer code for decrypting the outdated encrypted data in the identified storage section to generate outdated data; and computer code for releasing the outdated data to free space in the identified storage section.

16. The computer program product of claim 15, further comprising computer code for receiving the data for storage in the encrypted logical data object;

computer code for encrypting the data to generate encrypted data; and computer code for storing the encrypted data in a space in the storage section vacated by the released outdated data.

17. The computer program product of claim 16, further comprising computer code for sequentially storing the encrypted data in the storage section in an order the data was received.

18. The computer program product of claim 15, wherein the computer code for decrypting the outdated encrypted data comprises computer code for decrypting the outdated encrypted data in an order the outdated encrypted data was originally received for storage.

19. The computer program product of claim 18, wherein the computer code for releasing the outdated data comprises computer code for releasing the outdated data in the order the outdated data was decrypted.

20. The computer program product of claim 15, wherein the computer code for decrypting the outdated encrypted data comprises computer code for decrypting the outdated encrypted data in an order the outdated encrypted data was encrypted and stored in the storage section.

21. The computer program product of claim 20, wherein the computer code for releasing the outdated data comprises computer code for releasing the outdated data in the order the outdated data was encrypted and stored in the storage section.

* * * * *